US005914441A

United States Patent [19]
Hunter et al.

[11] Patent Number: 5,914,441
[45] Date of Patent: Jun. 22, 1999

[54] BIOCATALYZED ANAEROBIC OXIDATION OF METAL SULFIDES FOR RECOVERY OF METAL VALUES

[75] Inventors: Robert M. Hunter; Frank M. Stewart, both of Bozeman, Mont.

[73] Assignee: Yellowstone Environmental Science, Inc., Bozeman, Mont.

[21] Appl. No.: 08/662,050

[22] Filed: Jun. 12, 1996

Related U.S. Application Data

[63] Continuation-in-part of application No. 08/436,726, filed as application No. PCT/US95/09199, Jun. 26, 1995, Pat. No. 5,672,194.
[51] Int. Cl.⁶ ...................................................... C22B 3/18
[52] U.S. Cl. .............................. 75/712; 75/744; 266/101; 423/DIG. 17; 435/262; 435/262.5
[58] Field of Search ............. 75/712, 744; 423/DIG. 17; 435/262, 262.5; 266/101

[56] References Cited

U.S. PATENT DOCUMENTS

| | | | |
|---|---|---|---|
| 2,829,964 | 4/1958 | Zimmerley et al. | |
| 3,218,252 | 11/1965 | Glover et al. | 75/101 |
| 4,571,263 | 2/1986 | Weir et al. | 75/101 |
| 4,729,788 | 3/1988 | Hutchins et al. | 75/118 |
| 4,778,519 | 10/1988 | Pesic | 75/118 |
| 4,789,529 | 12/1988 | Robinson et al. | 423/109 |
| 4,822,413 | 4/1989 | Pooley et al. | 75/118 |
| 4,902,345 | 2/1990 | Ball et al. | 75/118 |
| 4,987,081 | 1/1991 | Hackl et al. | 435/262 |
| 5,013,359 | 5/1991 | Fair et al. | 75/744 |
| 5,076,927 | 12/1991 | Hunter | 210/603 |
| 5,104,445 | 4/1992 | Dubrovsky et al. | 75/585 |
| 5,127,942 | 7/1992 | Brierley et al. | 75/743 |
| 5,147,618 | 9/1992 | Touro et al. | 423/27 |
| 5,223,024 | 6/1993 | Jones | 75/43 |
| 5,238,662 | 8/1993 | Dubrovsky | 423/27 |
| 5,246,486 | 9/1993 | Brierley et al. | 75/743 |
| 5,316,751 | 5/1994 | Kingsley | 435/262.5 |
| 5,366,891 | 11/1994 | Premuzic et al. | 435/262 |
| 5,449,397 | 9/1995 | Hunter et al. | 75/44 |
| 5,462,720 | 10/1995 | Aragones | 423/27 |

FOREIGN PATENT DOCUMENTS

| | | |
|---|---|---|
| 757602 | 4/1967 | Canada . |
| 869470 | 4/1971 | Canada . |
| 1018774 | 10/1977 | Canada . |

OTHER PUBLICATIONS

Alper, J. (1984). Bacterial methods may strike it rich in refining metals, cleaning coal. *High Technology*, Apr., 32–35.

Biedermann, G. & Schindler, P. (1957). On the solubility Product of Precipitated Iron(III) Hydroxide. *ACTC Chemica Scandinavica*, 11, 4, 731–740.

Brierley, C.L., & Brierley, J.A. (1973). A chemoautotrophic and thermophilic microorganism isolated from an acid hot spring. *Canadian J. Microbiology*, 19, 183–188.

Brock, T.D. & Gustafson, J. (1976). Ferric Iron Reduction by Sulfur– and Iron–Oxidizing Bacteria. *Applied and Environmental Microbiology*, 32. 567–571.

Budden, J.R., & Spencer, P.A. (1993). Tolerance to temperature and water quality for bacterial oxidation: The benefits of BacTech's moderately thermophilic culture. *FEMS Microbiology Reviews*, 11, 191–196.

Chapman, J.T., Marchant, P.B., Lawrence, R.W., & Knopp, R. (1993). Bio–oxidation of a refractory gold bearing high arsenic sulphide concentrate: A pilot study. *FEMS Microbiology Reviews*, 11, 243–252.

Chavarie, C., Karamanev, D., Godard, F., Garnier, A., & Andre, G. (1993). Comparison of the kinetics of ferrous iron oxidation by three different strains of *Thiobacillus ferrooxidans*. *Geomicrobiology Journal*, 11, 57–63.

De Rosa, M., Gambacorta, A., & Bullock, J.D. (1975). Extremely thermophilic acidophilic bacteria convergent with *Sulfolobus acidocaldarius*. *J. General Microbiology*, 86, 156–164.

Duarte, J.C., Estrada, P.C., Pereira, P.C., & Beaumont, H.P. (1993). *FEMS Microbiology Reviews*, 11, 97–102.

Hackl, R.P., Wright, F., & Bruynesteyn, A. (1986). A new biotech process for refractory gold–silver concentrates. *Proceedings of the Third Annual General Meeting of Biominet*, Aug. 20–21, 71–90.

Hansford, G.S. & Miller, D.M. (1993). Biooxidation of a gold–bearing pyrite–arsenopyrite concentrate. *FEMS Microbiology Reviews*, 11, 175–182.

Hoffmann, W., Katsikaros, N., & Davis, G. (1993). Design of a reactor bioleach process for refractory gold treatment. *FEMS Microbiology Reviews*, 11, 221–230.

(List continued on next page.)

*Primary Examiner*—Melvyn Andrews
*Attorney, Agent, or Firm*—Robert M. Hunter

[57] ABSTRACT

A method and apparatus for anaerobic oxidation of metal sulfides in ores and concentrates. Base-metal and precious-metal ores and concentrates often contain metal sulfides, such iron sulfides (e.g., pyrite, pyrhotite, arsenopyrite, etc.), copper sulfides (e.g., chalcopyrite, chalcocite, etc.), zinc sulfides (e.g., sphalerite, etc.) and/or lead sulfides (e.g., galena, etc.) and/or other metal sulfides), that must be oxidized in order to recover metal values (e.g., gold, silver, or platinum group elements) from the ores. In the present invention, these metal sulfides are oxidized in one reactor under anaerobic or anoxic conditions using oxidized metal ions, such as ferrous ions ($Fe^{+3}$), as the oxidizing agent. Anaerobic oxidation of elemental sulfur that is produced by metal sulfide oxidation is biocatalyzed by sulfur-oxidizing bacteria, such as *Thiobacillus ferrooxidans, Thiobacillus thiooxidans,* or or *Sulfolobus sp.* The oxidized metal ions are produced biologically by iron-oxidizing bacteria in another reactor under aerobic conditions. In a preferred embodiment, the anaerobic reactor is an upflow, counter-current reactor having a fluidized bed of ore or concentrate particles and the aerobic reactor is a plug-flow reactor or a biofilm reactor.

9 Claims, 7 Drawing Sheets

OTHER PUBLICATIONS

Kelly, D.P. & Jones C.A. (1978) Factors affecting metabolism and ferrous iron oxidation in supensions and batch cultures of *Thiobacillus ferrooxidans:* Relevance to ferric iron leach solution. In L.E. Murr, A.E. Torma & J.A. Brierley (Eds.), *Metallurgical Applications of Bacterial Leaching and Related Microbiological Phenomena* (pp. 19–45). New York: Academic Press.

Lamb, A.B. & Jacques, A.G. (1938). The Slow Hydrolysis of Ferric Chloride in Dilute Solution. I. The Change Conductance, Color and Chloride Ion Concentration. *Hydrolysis of Ferric Chloride in Dilute Solution,* vol. 60, 967–981.

Liu, X., Petersson, S., & Sandstrom, A. (1993). Evaluation of process variables in bench–scale bio–oxidation of the Olympias concentrate. *FEMS Microbiology Reviews,* 11, 207–214.

Livesay–Goldblatt, E.(1986). *Fundamental and Applied Biohydrometallurgy,* (pp. 89–96). Proc. 6th International Symposium on Biohydrometallurgy, Vancouver, B.C.

MacDonald, D.G. & Clark, R.H. (1970). The Oxidation of Aqueous Ferris Sulphate by *Thiobacillus ferrooxidans. Can J Chem. Eng,* vol. 48, 669–676.

Marchant, P.B., & Lawrence, R.W. (1986). Flowsheet design, process control, and operating strategies in the biooxidation of refractory gold ores. *Proceedings of the Third Annual General Meeting of Biominet,* Aug. 20–21, (pp. 39–51). Toronto, Canada: Canmet Special Publication.

Marsden, J., & House, I. (1993). *The Chemistry of Gold Extraction.* New York: Ellis Horwood (221–234).

Maturana, H., Lagos, U., Flores, V., Gaeta, M., Cornejo, L., & Wiertz, J.V. (1993). Integrated biological process for the treatment of a Chilean complex gold ore. *FEMS Microbiology Reviews,* 11, 215–220.

McGoran, C.J.M., Duncan, D.W. & Walden, C.C. (1969). Growth of *Thiobacillus ferrooxidans* on Various Substrates. *Can. J of Microbiology,* vol. 15, 135–138.

Moffat, A.S. (1994). Microbial mining boosts the environment, bottom line. *Science,* 264, 778–779.

Norris, P.R., & Owen, J.P. (1993). Mineral sulphide oxidation by enrichment cultures of novel thermoacidophilic bacteria. *FEMS Microbiology Reviews,* 11, 51–56.

Olson, G.L. & Kelly, K.M. (1986). Microbiological Metal Transformations: Biotechnology Application and Potential. *Biotechnology Progress* vol. 2 No. 1, 1–15.

Pantelis, G., & Ritchie, A.I.M. (1993). Rate controls on the oxidation of heaps of pyritic material imposed by upper temperature limits on the bacterially catalyzed process. *FEMS Microbiology Reviews,* 11, 183–190.

Pronk, J.T., de Bruyn, J.C., Bos, P., & Kuenen, J.G. (1992). Anaerobic growth of *Thiobacillus ferrooxidans. Applied and Environmental Microbiology,* 58, 2227–2230.

Pugh, L.H. & Umbreit, W.W. (1966). Anaerobic $CO_2$ Fixation by Autotrophic Bacteria, Hydrogenomonas and Ferrobacillus. *Archives of Biochemistry and Biophysics,* vol. 115, 122–128.

Roels, J.A. (1980). Simple model for the energetics of growth on substrates with different degrees of reduction. *Biotech. Bioeng.,* 22, 33–53.

Thauer, R.K., Jungermann, K., & Decker, K. (1977). Energy conservation in chemotrophic anaerobic bacteria. *Bacteriol. Rev.,* 41, 100–180.

Unz, R.F. & Lundgren, D.G. (1961). A Comparative Nutritional Study of Three Chemoautotrophic Bacteria: *Ferrobacillus ferrooxidans,, Thiobacillus ferrooxidans,* and *Thiobacillus thiooxidans. Soil Science,* 92. 302–313.

Van der Meer, R., Westerhoff, H.V., & Van Dam, K. 1980 . Linear relation between rate and thermodynamic force in enzyme–catalyzed reactions. *Biochimica et Biophysica Acta,* 591, 488–493.

Wells, R.C. (1909). The Electrical Conductivity of Ferric Sulphate Solution. *General, Physics, and Organic,* 1027–1035.

Bailey, A.D. & Hansford, G.S. (1993). A fluidised bed reactor as a tool for the investigation of oxygen availabillity on the bio–oxidation rate of sulphide minerals at highs solids concentrations. *Minerals Engineering,* 6, 387–396.

Brierley, J.A. & Brierley, C.L. (1986). Microbial mining using thermophilic microorganisms. *Thermophiles: General, Molecular, and Applied Microbiology* (pp. 279–303). New York, John Wiley and Sons.

Corbett, C.M. & Ingledew, W.J. (1987). Is $Fe3+/2+$ cycling an intermediate in sulphur oxidation by $Fe2+$–grown *Thiobacillus ferrooxidans? FEMS Microbiology Letters,* 41, 1–6.

Das, A., Mishra, A.K. & Roy, P. (1992). Anerobic growth on elemental sulfur using dissimilar iron reduction by autotrophic *Thiobacillus ferrooxidans. FEMS Microbiology Letters,* 97, 167–172.

Duncan, D.W. Landesman, J. & Walden, C.C. (1967). Role of *Thiobacillus Ferrooxidans* in the oxidation of sulfide minerals. *Canadian Journal of Microbiology,* 13, 397–403.

Egamberdieva, K.Y., Pis'man, T.I., Elkina, T.V. Furyaeva, A.V. & Pechurkin, N.S. (1976). Growth kinetics of *Thiobacillus ferrooxidans* in batch and continuous culture. *Applied Biochemistry and Microbiology,* 12, 707–710.

Free, M.L., Oolman, T. Nagpal, S., & Dahlstrom, D.A. (1993). A comparison of leaching by attached and nonattached bacteria of a pyrite/arsenopyrite gold–ore concentrate. In A.E. Torman, J.E. Wey & V.L. Lakshmanan (Eds.) *Biohydrometallurgical Technologies.* The Minerals, Metals & Materials Society, 459–469.

Fry, I. & Garcia, E. (1989). Cloning and characterization of *Thiobacillus ferrooxidans* genes involved in sulfur assimilation. In Salley, J., McCready, R.G.L. & Wichlacz, P.L. (Eds.) *Biohydrometallurgy: Proceedings of the International Symposium, Jackson Hole, Wyoming,* pp. 171–185.

Gormely, L.S. & Branion, R.M.R. (1989). Engineering design of microbiological leaching reactors. In Salley, J., McCready, R.G.L. & Wichlacz, P.L. (Eds.) *Biohydrometallurgy: Proceedings of the International Symposium, Jackson Hole, Wyoming,* pp. 499–518.

Gould, W.D., McCready, R.G.L., Rajan, S. & Krouse, H.R. (1989). Stable isotope composition of sulphate produced during bacterial oxidation of various metal sulphides. In Salley, J., McCready, R.G.L. & Wichlacz, P.L. (Eds.) *Biohydrometallurgy: Proceedings of the International Symposium, Jackson Hole, Wyoming,* 81–91.

Hazeu, W., Schmedding, D.J., Goddijn, O., Bos, P. & Kuenin, J.G. (1987). The importance of the sulphyr oxidizing capacity of *thiobacillus ferrooxidans* during leaching of pyrite. *Proceedings: 4th Congress on Biotechnology,* 3, 497–499.

Herrera, M.N., Alfaro, D., Escobar, B., Espejo, R.T., Vargas, T., & Wiertz, J.V. (1989). The kinetics of sulfur oxidation by *Thiobacilllius ferrooxidans*. In Salley, J., McCready, R.G.L. & Wichlacz, P.L. (Eds.) *Biohydrometallurgy: Proceedings of the International Symposium, Jackson Hole, Wyoming*, 415–421.

Kandemir, H. (1985). Fate of sulphide sulphur in bacterial oxidation of sulphide minerals. *Microbiological Effects on Metallurgical Processes*. Pennsylvania: The Metallurgical Society, Inc., 51–63.

Karamanev, D.G. & Nikolov, L.N. (1988). Influence of some Physicochemical parameters on bacterial activity of biofilm: Ferrous iron oxidation by *Thiobacillus ferrooxidans*. *Biotehcnology and Bioengeneering*, 31, 295–299.

Kinsel, N.A. (1960). New sulfur oxidizing iron bacterium: *ferrobacillus sulfooxidans* SP. N. *Journal of Bacteriology*, 80, 628–632.

Landesman, J., Duncan, D.W. & Walden, C.C. (1966). Oxidation of inorganic sulfur compounds by washed cell suspensions of *thiobacillus ferrooxidans*. *Canadian Journal of Microbiology*, 12, 957–964.

Margalith, P., Silver, M. & Lundgren, D.G. (1966). Sulfur oxidation by the iron bacterium *Ferrobacillus ferrooxidans*. *Journal of Bacteriology*, vol. 92, No. 6, 1706–1709.

Mehta, K.B. & LeRoux, N.W. (1974). Effect of wall growth on continuous biological oxidation of ferrous iron. *Biotechnology and Bioengineering*, vol. XVI, 559–563.

Nagpal, S., Dahlstrom, D., & Oolman, T. (1993). Effect of carbon dioxide concentration on the bioleaching of a pyrite–arsenopyrite ore concentrate. *Biotechnology & Bioengineering*, 41, 459–464.

Nagpal, S., Dahlstrom, D., & Oolman, T. (1994). A mathematical model for the bacterial oxidation of a sulfide ore concentrate. *Biotechnology and Bioengineering*, 43, 357–364.

Nakamura, K., Noike, T. & Matsumoto, J. (1986). Effect of operation conditions on biological Fe2+ oxidation with rotating biological contactors. *Wat. Res.*, 20, 73–77.

Olem, H. & Unz, R.F. (1977). Acid mine drainage treatment with roatating biological contactors. *Biotechnology and Bioengineering*, 19, 1475–1491.

Oolman, T. (1993). Bioreactor design and scaleup applications in minerals bioleaching. In A.E. Torma, J.E. Wey & V.L. Lakshmanan (Eds.) *Biohydrometallurgical Technologies*. The Minerals, Metals & Materials Society, 401–415.

Pesic, B. (1993). Redox potential technique to study the factors of importance during reactions of *T. Ferroxidans* with Fe2+. In A.E. Torma, J.E. Wey & V.L. Lakshmanan (Eds.) *Biohydrometallurgical Technologies*. The Minerals, Metals & Materials Society, 545–560.

Pronk, J.T., Liem, K, Bos, P. & Kuenen, J.G. (1991). Energy transduction by anaerobic ferric iron respiration in *Thiobacillus ferrooxidans*. *Applied and Environmental Microbiology*, 57, 2063–2068.

Pronk, J.T., Meulenberg, R., Hazeu, W., Bos, P. & Kuenen, J.G. (1990). Oxidation of reduced inorganic sulphur compounds by *acidophilic thiobacilli*. *FEMS Microbiology Reviews*, 75, 293–306.

Shivvers, D.W. & Brock, T.D. (1973). Oxidation of elemental sulfur by *Sulfolobus acidocaldarius*. *Journal of Bacteriology*, 114, 706–710.

Silver, M. (1970). Oxidation of elemental sulfur and sulfur compounds and $CO_2$ fixation by *Ferrobacillus Ferrooxidans* (*Thiobacillus ferrooxidans*). *Canadian Journal of Microbiology*, vol. 16, No. 9, 845–849.

Silverman, M.P. & Lundgren, D.G. (1959). Studies on the chemoautotrophic iron bactierium *Ferrobacillus ferrooxidans*. *Journal of Bacteriology*, 77, 642–647.

Sugio, T., Hirose, T., Oto, A., Inagaki, K., & Tano, T. (1989). The regulation of sulfur utilization by ferrous ion in *Thiobacillus ferrooxidans*. In Salley, J., McCready, R.G.L. & Wichlacz, P.L. (Eds.) *Biohydrometallurgy: Proceedings of the International Symposium, Jackson Hole, Wyoming*, 451–459.

Sugio, T., White, K.J., Shute, E.,. Choate, D. & Blake II, R.C. (1992). Existence of a hydrogen sufided: Ferric ion oxidoreductase in iron–oxidizing bacteria. *Applied and Environmental Microbiology*, 58, 431–433.

Suzuki, I., Takeuchi, T.L., Yuthasastrakosol, T.D. & Oh J.K. (1990). Ferrous iron and sulfur oxidation and ferric iron reduction activities of *Thiobacillus ferrooxidans* are affected by growth on ferrous iron, sulfur, or a sulfide ore. *Applied and Environmental Microbiology*, 56, 1620–1626.

Wichlacz, P.L. & Olem, H. (1985). Kinetics of biological ferrous iron oixidation. *Microbiological Effects on Metallurgical Processes*. Pennsylvania: The Metallurgical Society, Inc., 83–97.

5,914,441

BIOCATALYZED ANAEROBIC OXIDATION OF METAL SULFIDES FOR RECOVERY OF METAL VALUES

RELATED PATENT APPLICATIONS

This application is a continuation in part of the following patent applications: U.S. patent application Ser. No. 08/436,726, filed May 8, 1995, now U.S. Pat. No. 5,672,194, entitled, "Method and Apparatus for Extracting Precious Material from Their Ores and the Product Thereof," and PCT patent application Ser. No. PCT/US95/09199, filed Jun. 26, 1995, entitled "Method and Apparatus for Extracting Precious Material from Their Ores and the Product Thereof." The disclosures of those patent applications are incorporated by reference herein as if fully set forth.

STATEMENT AS TO RIGHTS IN INVENTIONS MADE UNDER FEDERALLY-SPONSORED RESEARCH AND DEVELOPMENT

This invention was made with U.S. Government support under Small Business Innovation Research Grant No. DMI-9461234 which was awarded by the National Science Foundation (NSF), an independent agency of the U.S. Government. The U.S. Government has certain rights in the invention.

TECHNICAL FIELD

This invention relates to a method and apparatus for extracting precious metals from their ores and the product thereof. In particular, it relates to the following: (1) a biohydrometallurgical process and apparatus for extraction and recovery of metal values from ores and concentrates; (2) the products of that process and apparatus.

BACKGROUND ART

Development of cost-effective techniques for recovering base and precious metals from their ores has been the goal of metallurgists for hundreds of years. Today, metallurgists are increasingly called upon to design processes for ores that are refractory to conventional recovery techniques. These challenges and the addition of environmental costs (including site remediation) to the total cost of mining have stimulated a search for alternatives to conventional methods for liberating precious metal values from sulfidic ores. An example of this need was highlighted at Randol Gold Forum '96 as follows (von Michaelis, H., "Gold-copper and copper-gold: Need for better processing technologies is urgent." *Randol Gold Forum '96* Golden, CO: Randol International, 1996):

"There are more gold-copper and copper-gold ore deposits being discovered than ever before. Some of these are giant deposits, and they are located in all continents: Canada, USA, South America, Asia, Australia, Africa, and eastern Europe. The need for better processing technologies for treatment of copper-gold ores that do not respond to simple flotation is urgent and immediate."

There are three practical approaches to liberating gold from refractory ores in situations where the gold is intimately associated with sulfides: roasting, pressure oxidation (autoclaving) and bio-oxidation (Marsden, J. & House, I., *The Chemistry of Gold Extraction.* New York: Ellis Horwood, 1993). Roasting requires the construction and operation of an expensive and complex multiple-hearth or fluidized-bed furnace. Moreover, the process produces off-gases containing particulates and oxides of sulfur and arsenic that must be removed from the gas stream for both environmental reasons (e.g., prevention of acid rain) and for operational reasons. As an example, M. C. Robinson, D. W. Kirk and B. Jue (1988) in U.S. Pat. No. 4,789,529, Dec. 6, 1988, disclose a process for recovery of zinc from zinc-bearing sulfidic ores and concentrates by controlled oxidation roasting.

Pressure oxidation requires the construction of autoclave vessels that are operated at high temperatures (180 to 225° C.) and pressures (1,500 to 3,200 kPa). These pressure vessels are considered to be "bombs" by many in the industry and concern about using highly pressurized vessels to process extremely corrosive slurries is widespread. For example, D. R. Weir and R. M. Genik-Sas-Berezowsky (1986) in U.S. Pat. No. 4,571,263, Feb. 18, 1986, discloses a process for recovery of gold from refractory auriferous iron-containing sulphidic concentrates that incorporates pressure oxidation. D. L. Jones in U.S. Pat. No. 5,223,024, Jun. 29, 1993, discloses a hydrometallurgical copper extraction process that incorporates agitated leaching at an elevated temperature and pressure. With both roasting and autoclaving, partial or selective oxidation of sulfides is not practical even in situations where it is not necessary to completely oxidize the sulfide to liberate the gold.

The remaining practical alternative is a bioprocess called bio-oxidation. Literally for centuries, the aerobic biological oxidation process (termed bio-oxidation) has been used by man to accelerate the solubilization of base-metal values in ores. The process has found particularly wide application in recovery of copper from ores and concentrates that contain copper-sulfide minerals and in recovery of uranium from its ores. For example, S. R. Zimmerley, D. G. Wilson and J. D. Prater in U.S. Pat. No. 2,829,924, Apr. 8, 1958, disclose a hydrometallurgical process for employing iron-oxidizing bacteria to regenerate a ferric sulfate, sulfuric acid lixiviant for leaching copper sulfide ores. The leach solution is aerated within a reservoir using "any suitable procedure for introducing oxygen and carbon dioxide into the solution" including "the bubbling of compressed air through the solution within the reservoir, the vigorous agitation of the body of the solution by mechanical means, and even, in some instances, the provision of extensive surface area for the reservoir relative to its depth." J. L. B. Aragones in U.S. Pat. No. 5,462,720, Oct. 31, 1995, discloses a process for leaching copper sulfides with a ferric-iron leach solution regenerated by "bacterial films of *Thiobacillus ferrooxidans* attached to an inert solid" in a bed of carrier material. E. T. Premuzic and M. S. Lin in U.S. Pat. No. 5,366,891, Nov. 22, 1994, disclose a method for biochemical solubilization of metal sulfides in geothermal sludge using *Thiobacillus ferrooxidans* and *Thiobacillus thiooxidans* mutants.

In bio-oxidation, aerobic, acidophilic, autotrophic bacteria, such as *Thiobacillus ferrooxidans, Leptospirillum ferrooxidans* and *Sulfolobus sp.*, are used to oxidize iron and sulfur minerals in which precious-metals are encapsulated or otherwise contained Ehrlich, H. L., & Brierley, C. L., *Microbial Mineral Recovery.* New York: McGraw-Hill., 1990). While bio-oxidation offers great promise due to its lower cost and reduced environmental impact, the ways in which it has been implemented in practice have generally made it impractical and too costly for large-scale application. Commercial process designs have been modeled on the century-old, abiotic, cyanidation process—a process with which hydrometallurgical engineers are very familiar. Bio-oxidation process designs, including biofilm reactors, slurry-pipeline reactors and fluidized-bed reactors, as well as process models are reviewed by Olsen, G. J. and Kelly, R.

M. in "Microbiological metal transformations: Biotechnological applications and potential," (*Biotechnology Progress* (Vol. 2. No. 1), March, 1986).

A significant amount of work in the field of bio-oxidation and metals extraction has been accomplished by a variety of investigators. Tomizuka, N. & Yagisawa, M., in "Optimum conditions for leaching of uranium and oxidation of lead sulfide with *Thiobacillus ferrooxidans* and recovery of metals from bacterial leaching solution with sulfate-reducing bacteria," (*Metallurgical Applications of Bacterial Leaching and Related Microbiological Phenomena,* Murr, L. E., Torma, A. E., & Brierley, J. A. (Eds.) New York: Academic Press, 1978), describe a two-step process for leaching of uranium and oxidation of lead sulfide where recovery of metals is accomplished by means of microbial sulfate reduction. Alper, J., in "Bacterial methods may strike it rich in refining metals, cleaning coal," (*High Technology,* April, 1984, pp. 32–35), describes the bio-oxidation of gold-bearing arsenopyrite/pyrite and notes that production of large amounts of arsenic and sulfurous gases is avoided. Torma, A. E., (*Biotechnology: A Comprehensive Treatise in 8 Volumes,* Deerfield Beach, Fla.: Verlag Chemie, 1988), reviewed bioleaching processes. Livesay-Goldblatt, E., (*Fundamental and Applied Biohydrometallurgy,* Proc. 6th International Symposium on Biohydrometallurgy, Vancouver, B.C. 89–96, 1986), described a process for gold recovery from arsenopyrite/pyrite ore by bacterial leaching and cyanidation. Torma, A. E., (*Biotechnology: A comprehensive treatise in 8 volumes,* Deerfield Beach, Fla.: Verlag Chemie, 1988), reviews bio-oxidation of gold and silver ores. Hackl, R. P., Wright, F., & Bruynesteyn, A., (*Proceedings of the Third Annual General Meeting of Biominet,* August 20–21, 71–90, 1986), described development of the BIOTANKLEACH process for leaching pyritic materials from gold and silver ore. The results of bench-scale and pilot-scale evaluations were presented. Marchant, P. B., & Lawrence, R. W., in "Flowsheet design, process control, and operating strategies in the bio-oxidation of refractory gold ores," (*Proceedings of the Third Annual General Meeting of Biominet,* August 20–21, 39–51, 1986), listed considerations in the design of commercial bio-oxidation plants. Lawrence R. W., in "Biotreatment of Gold," (*Microbial Mineral Recovery* New York: McGraw-Hill edited by Ehrlich, H. L. and Brierly, C. L, 1990), discussed biotreatment of gold ore. The benefits of using the BacTech moderately thermophilic cultures in bio-oxidation processes were discussed by Budden, J. R., & Spencer, P. A. in "Tolerance to temperature and water quality for bacterial oxidation: The benefits of BacTech's moderately thermophilic culture," (*FEMS Microbiology Reviews,* 11, 191–196, 1993). Chapman, J. T., Marchant, P. B., Lawrence, R. W., & Knopp, R., in "Biooxidation of a refractory gold bearing high arsenic sulphide concentrate: A pilot study," (*FEMS Microbiology Reviews,* 11, 243–252, 1993), described a modular mobile bioleach pilot plant for bio-oxidation of a refractory gold-bearing high-arsenic sulfide concentrate. Moffat, A. S., in "Microbial mining boosts the environment," (*Science,* 264, 778–779, 1994), disclosed how bio-oxidation can increase the efficiency of mining.

While most strains of *T. ferrooxidans* are considered to be mesophiles that grow optimally at about 35° C., microbiologists have discovered facultative and obligate thermophilic iron- and sulfur-oxidizing bacteria, including *Sulfolobus brierlevi, Sulfolobus acidocaldarius, Sulfolobus solfataricus, Sulfolobus BC* and others. Thermophilic versus mesophilic bioleaching process performance was evaluated by Duarte, J. C., Estrada, P. C., Pereira, P. C., & Beaumont, H. P. (*FEMS Microbiology Reviews,* 11, 97–102, 1993). Two years of BIOX bio-oxidation pilot plant data were analyzed by Hansford, G. S., & Miller, D. M. in "Biooxidation of a gold-bearing pyritearsenopyrite concentrate," (*FEMS Microbiology Reviews,* 11, 175–182, 1993). Hoffman, W., Katsikaros, N., & Davis, G., in "Design of a reactor bioleach process for refractory gold treatment," (*FEMS Microbiology Reviews,* 11, 221–230, 1994), described the design of a reactor bioleach process for refractory gold treatment. Liu, X., Petersson, S., & Sandstrom, A., in "Evaluation of process variables in bench-scale bio-oxidation of the Olympias concentrate," (*FEMS Microbiology Reviews,* 11, 207–214, 1993), presented an evaluation of the effects of process variables on pyrite/arsenopyrite oxidation and gold extraction. Maturana, H., Lagos, U., Flores, V., Gaeta, M., Cornejo, L., & Wiertz, J. V., in "Integrated biological process for the treatment of a Chilean complex gold ore," (*FEMS Microbiology Reviews,* 11, 215–220, 1993), described an integrated biological process for treatment of a complex gold ore. Mineral sulfide oxidation by enrichment cultures of a novel thermoacidophilic bacteria were described by Norris, P. R. & Owen, J. P. in "Mineral sulphide oxidation by enrichment cultures of novel thermoacidophilic bacteria," (*FEMS Microbiology Reviews,* 11, 51–56, 1993). Rate controls on the bio-oxidation of heaps of pyritic material imposed by bacterial upper temperature limits were described by Pantelis, G. & Ritchie, A. I. M. in "Rate controls on the oxidation of heaps of pyritic material imposed by upper temperature limits on the bacterially catalyzed process," (*FEMS Microbiology Reviews,* 11, 183–190, 1993). Bio-oxidation bacteria have been characterized in detail. Brierly, C. L., & Brierly, J. A., in "A chemoautotrophic and thermophilic microorganism isolated from an acid hot spring," (*Canadian J. Microbiology,* 19, 183–188, 1973), characterized a chemoautotrophic and thermophilic (70° C.) microorganism isolated from an acid hot spring. De Rosa, M., Gambacorta, A., & Bullock, J. D., in "Extremely thermophilic acidophilic bacteria convergent with *Sulfolobus acidocaldarius*," (*J. General Microbiology,* 86, 156–164, 1975), characterized the extremely thermophilic (85° C.), acidophilic (pH 1.0) bacteria *Sulfolobus acidocaldarius.*

A number of investigators have characterized *Thiobacillus ferrooxidans* growth under anaerobic conditions. Pugh, L. H. and Umbreit, W. W. in "Anaerobic $CO_2$ Fixation by Autotrophic Bacteria, Hydrogenomonas and Ferrobacillus," (*Archives of Biochemistry and Biophysics,* 115. 122–128, 1966), noted that "it is possible (for *T. ferrooxidans*) to achieve $CO_2$ fixation under completely anaerobic conditions providing the oxidizable substrate (ferrous iron) is present." in recognizing the importance of removal of elemental sulfur that is produced during metal-sulfide oxidation, Brook, T. D. & Gustafson, J. in "Ferric Iron Reduction by Sulfur- and Iron-Oxidizing Bacteria," (*Applied and Environmental Microbiology,* 32. 567–571, 1976), suggested that "more rapid or effective leaching with ferric iron would be obtained if care were taken to develop and maintain a large active population of bacteria within a leach dump." Kelly, D. P. & Jones, C. A. in "Factors Affecting Metabolism and Ferrous Iron Oxidation in Suspension and Batch Cultures of *Thiobacillus Ferrooxidans:* Relevance to Ferric Iron Leach Solution Regeneration," (*Basic Microbial Studies Applied to Leaching.* 19–43, 1983), noted that "growing cultures (of *T. ferrooxidans*), whose growth ceases because of $CO_2$ exhaustion, are still capable of oxidizing $FeSO_4$ at a high rate for long periods." Brock, T. D., Smith, D. W., & Madigan, M. T. (*Biology of Microorganisms.* NJ: Prentice- Hall, Inc., 1984), noted "because of the huge dimensions of copper leach dumps, penetration of oxygen from air is poor, and the interior of these piles is usually anaerobic. Although most of the (oxidation) reactions . . . require molecular $O_2$, it is also known that *T. ferrooxidans* can use $Fe^{+3}$ as an electron acceptor in the absence of $O_2$, and thus catalyze the oxidation reactions . . . anaerobically." Goodman, A. E., Babij, T. and Ritchie, A. I. M. in "Leaching of a sulfide ore by *Thiobacillus ferrooridans* under anaerobic conditions," (*Recent Progress in Biohydrometallury*, 361–376, 1983) Giovanni R. and Torma, A. E. (Eds.), Iglesias, Italy: Associazione Mineraria Sarda), compared aerobic and anaerobic batch leaching of a natural zinc-iron sulfide at pH 2.5. In their leaching experiments, they added nutrients and $CO_2$ to the reactors, but did not add metal ions, such as $Fe^{+2}$ ions or $Fe^{+3}$ ions. Leaching of the zinc-iron sulfide under aerobic conditions resulted in production of acid, high numbers of bacteria being present in the supernatant, and a maximum of 48 percent of the iron in the ore being solubilized "and then it gradually precipitated out." Under aerobic conditions, "by the end of the run no iron was detected in solution." Leaching under anaerobic conditions produced "no precipitates or jarosite" and "no detectable acid," solubilization of 86 percent of the iron in the ore, and bacteria "firmly attached to the ore surfaces" with no bacteria in the supernatant. Under anaerobic conditions, $CO_2$ concentrations were higher than can be achieved by contact with air.

During the last decade, processes for bio-oxidation of pyritic and arsenopyritic sulfides in gold and silver ores have been developed to the point of commercial application (see Torma, A. E., *Biotechnology: A Comprehensive Treatise in 8 Volumes,* Deerfield Beach, Fla.: Verlag Chemie, 1981). Recent improvements in the art are disclosed by: Hutchins et al. in U.S. Pat. No. 4,729,788, Mar. 8, 1988; Pooley et al. in U.S. Pat. No. 4,822,413, Apr. 18, 1989; Hacki et al. in U.S. Pat. No. 4,987,081, Jan. 22, 1991; Hunter in U.S. Pat. No. 5,076,927, Dec. 31, 1991; Brierly et al. In U.S. Pat. No. 5,127,942, Jul. 7, 1992; and Brierly and Hill in U.S. Pat. No. 5,246,486, Sep. 21, 1993.

When bio-oxidation is practiced in agitated reactors (by far the most common approach), large mass flow rates of oxygen and carbon dioxide are dissolved in slurries of finely-ground, flotation-concentrate particles. According to Marsden, J. & House, I., (*The Chemistry of Gold Extraction.* New York: Ellis Horwood, 1993), a commercial- scale, whole-ore treatment process has yet to be developed. Relatively inefficient oxygen and carbon dioxide dissolution methods are used, such as mechanical mixing and/or coarse-bubble aeration, because more efficient methods (e.g., fine bubble aeration or oxygenation in biofilters) are inappropriate (e.g., due to their tendency to clog with slurry particles, etc.). When injection of air or oxygen into the slurry is practiced, energy consumption is very high because the pressure at which the gas must be introduced (at the bottom of the reactors) is increased due to the high specific gravity of the slurry (p in lb/sq f=$\gamma$ in lb/cu ft * h in ft). When practiced in heaps, the mass transfer rate (via diffusion or convection) of oxygen into the heap limits the rate and extent of direct bio-oxidation.

While the above problems are serious, they are similar to those encountered in the aerobic cyanidation process itself, and efforts are underway to address them. Other problems raise "show-stopping" obstacles to adoption of the concept at a large scale. One major problem is a thermodynamic one. Bio-oxidation is an exothermic process. Oxidation of metal sulfides produces as much heat as do mechanical mixing of slurries and compression of gases. This heat must be removed from the reaction environment to prevent sterilization and/or boiling of the slurry. The magnitude of the waste heat (slurry cooling) problem (typically on the order of megawatts) has not escaped engineers charged with evaluating the feasibility of the approach (usually compared to roasting or autoclaving). The fact that the problem cannot be eliminate by repealing the first law of thermodynamics is also understood. Significantly, because it is difficult to remove the heat fast enough iron metal-sulfide concentrate slurries, pulp densities in the 10–25 percent solids range are used, and more tankage volume is required for bio-oxidation than is required for the cyanidation process which is operated at pulp densities in the 35–50 percent range. If the solids content of metal-sulfide slurries could be increased (e.g., in counter-current, upflow reactors), the capital (and maintenance) costs of the bio-oxidation process would be reduced, thus lowering the cost of gold recovery and making uneconomic reserves economic to mine.

A second major problem is that bio-oxidation as usually practiced typically results in the production of large mass flow rates of acidity (protons or $H^+$ ions). This acidity must be neutralized in order to prevent sterilization of the slurry. Moreover, because the pH of the slurry must be elevated (to pH 10–11) prior to cyanidation, a large requirement for basicity ($OH^-$ ions) exists that must be met by addition of limestone, lime or sodium hydroxide. This, in turn, results in the production of large amounts of sludge that contains high concentrations of heavy metals and is difficult to dewater.

The above problems have existed for decades and persist today. They persist because system designers have not applied the principles of bioprocess engineering to solve them in an integrated, cross-disciplinary way. Moreover, process designers have not understood (and taken advantage of) all of the biocatalyzed reactions of the natural iron and sulfur cycles. Fortunately, there is a growing awareness within the industry that economic and regulatory (environmental) pressures will no longer allow nineteenth century approaches to these very real problems. The twenty-first century mineral processing challenges (very large operations, sulfidic ore bodies, environmental stewardship, etc.) will require new solutions—and biotechnologies will provide many of them.

With precious-metal ores, after metal-sulfide oxidation has occurred, precious metals are extracted from the ores. A great variety of precious-metal extraction processes have also been developed (see Gupta, C. K., & Mukherjee, T. K., *Hydrometallurgy in Extraction Processes,* Vol. I, Boston: CRC Press, 1990). Precious metal extraction processes are disclosed by: Pesic in U.S. Pat. No. 4,778,519, Oct. 18, 1988; Ball et al. in U.S. Pat. No. 4,902,345, Feb. 20, 1990; and Kandemir in UK Patent No. 2,180,829, published Apr. 8, 1987. F. J. Touro and T. K Wiewiorowski in U.S. Pat. No. 5,147,618, Sep. 15, 1992, disclose a process for recovering gold from refractory gold-bearing ores that uses sulfurous acid as the leaching agent. R. M. Hunter and F. M. Stewart in U.S. Pat. No. 5,449,397, Sep. 12, 1995, disclose an apparatus and method for biocatalyzed leaching of precious metals. The relatively low economic cost of cyanidation, however, has ensured its proliferation.

State-of-the-art precious metal heap leach practice varies with the nature of the ore. Biooxidation process steps may include ore crushing, acid pretreatment, inoculation with appropriate sulfide-oxidizing bacteria, addition of nutrients, recirculating the biolixiviant and cooling the heap (for 3 to 8 days), and allowing the heap to "rest" (for 3 to 8 days). Precious metal extraction by means of cyanidation may include the process steps of washing the heap for an extended period (e.g., 14 days) to remove residual acidity or iron content, breaking the heap apart in order to agglomerate it with cement and/or lime to make a new heap, leaching it with an alkaline cyanide or thiosulfate solution for 30 to 40 days, and recovery of gold and silver from the leach solution by absorption on activated carbon or zinc dust precipitation.

A variety of less-widely practiced methods of metal-sulfide oxidation are available in the prior art patent literature. M. Dubrovsky in U.S. Pat. No. 5,238,662, Aug. 24, 1993, discloses processes for recovering precious metals that incorporate molten salt chlorination. M. Dubrovsky and P. J. Marcantonio in U.S. Pat. No. 5,104,445, Apr. 14, 1992, disclose a process for recovering metals from refractory ores that involves chlorination of an ore concentrate in the presence of solid salt at a temperature between 300 and 650° C. K. J. Fair, G. van Weert and J. C. Schneider in U.S. Pat. No. 5,013,359, May 7, 1991, disclose a process for recovering gold from refractory sulfidic ore that involves using nitric acid as an oxidizing agent.

No single prior art reference or combination of references have suggested combining available knowledge to practice biocatalyzed anaerobic metal-sulfide oxidation as proposed herein. The prior art does not teach the use of anaerobic processes to solubilize base metals from metal sulfides using aerobically-regenerated, oxidized metal ions and to liberate (mobilize) precious-metals, such as gold, silver and platinum-group elements from their ores and concentrates. In fact, the prior art teaches away from the present invention toward aerobic processes for leaching of metals from ores and concentrates. Such aerobic processes are disclosed in the following recently published books on the subject: Ehrlich, H. L. (1990), *Microbial Mineral Recovery,* New York: McGraw-Hill; Gupta, C. K., & Mukhedee, T. K. (1990), *Hydrometallurgy in Extraction Processes, Vols. I and II,* Boston: CRC Press; Yannopoulos, J. C. (1991), *The Extractive Metallurgy of Gold,* New York: Van Nostrand Reinhold; Marsden, J. & House, I. (1993), *The Chemistry of Gold Extraction,* New York: Ellis Horwood. The disclosures in the aforementioned patents are incorporated by reference herein as if fully set forth.

NATURE OF THE INVENTION

For the purposes of this disclosure, the terms "ore" and "concentrate" refer to a composition of matter that comprises a metal sulfide and may comprise metal values. Thus, ore may be a mineral assemblage or coal that is being mined in-situ (in place) or that has been mined conventionally; or it may be a waste product, such as obsolete or damaged electronic components. A concentrate is a concentrated composition of metal sulfides produced by flotation or other means. The term "metal sulfide" means a chemical compound comprising a metal and sulfide. Examples include pyrite, chalcopyrite, marcasite, sphalerite, galena, argentite/acanthite, etc. Metal values may be base metals or precious metals. The term "base metals" refers to iron (Fe), copper (Cu), lead (Pb), zinc (Zn), cobalt (Co), uranium (U), and other metals that are not precious metals. The term "precious metals" refers to gold (Au), silver (Ag) and/or platinum-group elements (PGE). The term "platinum-group elements" refers to platinum (Pt), palladium (Pd), rhodium (Rh), ruthenium (Ru), osmium (Rh) and iridium (Ir). The term "oxidized metal ion" means an oxidized ion (i.e., at least one electron has been removed from the metal to give it a positive charge) of a base or precious metal.

The present invention provides a method and apparatus for biocatalyzed anaerobic oxidation of metal sulfides. Metal sulfides are oxidized under anoxic or anaerobic conditions using oxidized metal ions, preferably ferric ions ($Fe^{+3}$), as the oxidizing agent. Oxidation of the metal ions is catalyzed by iron-oxidizing bacteria, such as *Thiobacillus ferrooxidans* and *Sulfobulbus sp.*, preferably under aerobic conditions. Elemental sulfur ($S^0$) generated during metal sulfide oxidation is biologically oxidized under both anaerobic and aerobic conditions.

An ore containing a metal sulfide is crushed and/or ground to increase the surface area of metal sulfides to downstream chemical processes and to activate the metal sulfide to make it more amenable to chemical reaction. In one embodiment, a metal-sulfide concentrate is produced using a concentration process, such as flotation. The concentrate may be reground after it is produced.

The crushed and/or ground ore or concentrate is conditioned and converted into a slurry by wetting it with water or an aqueous solution and by reducing its pH with an acid or and acidic solution. Preferably, the aqueous solution used to condition the ore or concentrate contains a high concentration of soluble ferric sulfate and either little (less than 1 mg/l) or no dissolved oxygen. If necessary, the slurry is inoculated with iron- and/or sulfur-oxidizing bacteria. In some embodiments, when silver is present in the ore and/or concentrate and it is desired to recover it in a later process step, sufficient sodium chloride or potassium chloride is added to the solution to cause precipitation of silver liberated from metal sulfides.

The conditioned slurry is introduced to a reactor that is operated under molecular-oxygen-free (i.e., anoxic or anaerobic) conditions by excluding molecular oxygen from the reactor. In the anaerobic reactor, the (solid) metal sulfides in the ore or concentrate are at least partially oxidized to produce dissolved metal sulfates. The preferred oxidizing agent is a ferric sulfate solution that is added to the reactor and preferably recirculated through it. In some embodiments, carbon dioxide is added to the reactor to enhance the anaerobic growth of iron- and/or sulfur-oxidizing bacteria in the reactor. In one embodiment, at least a portion of the contents of the reactor are completely mixed by stirring or other means. In some embodiments, a series of anaerobic reactors is used with the slurry flowing or being pumped from one reactor to the next. In another embodiment, nitrate ions or another oxide of nitrogen are added to the anaerobic reactor to control the rate of metal-sulfide oxidation. In a preferred embodiment, over 90 percent of the metal sulfides oxidized in the anaerobic reactor are oxidized by ferric ions produced by the aerobic step of the process and over 90 percent of the elemental sulfur produced during oxidation of the metal sulfides is oxidized by sulfur-oxidizing bacteria therein. In a preferred embodiment, the anaerobic metal-sulfide oxidation reactor is operated as an upflow, fluidized-bed reactor in a counter-current mode with the solids moving downward in the reactor and the liquid moving upward.

In one embodiment, a series of anaerobic metal-sulfide oxidation reactors is used with the series operated in a counter-current mode. In this mode, at least a portion of the ferric-ion solution is introduced to the most downstream reactor and, as the solids in the slurry move from each upstream reactor to a downstream reactor, at least a portion of the liquid in the slurry moves from each downstream reactor to an upstream reactor. In another embodiment, a single anaerobic reactor or a series of anaerobic reactors are one or more ore dumps, heaps or vats of run-of-the mill or crushed ore. The dump(s), heap(s) or vat(s) may be covered to exclude oxygen or the oxygen demand of contained metal sulfides or elemental sulfur may be relied upon to create anoxic or anaerobic conditions therein. The solution containing ferric ions is applied to and allowed to flow through the dump(s), heap(s) or vat(s).

After the desired degree of oxidation of the metal sulfides is achieved (typically 50 to 80 percent), the slurry is discharged to a solids/liquid separation zone of the upflow reactor or to a separate unit such as a thickener. If the separated liquid does not contain metal values it is discharged to another (preferably aerobic reactor) for processing in the presence of oxygen and/or carbon dioxide. In this reactor, lower positive-valence metal ions, such as ferrous ($Fe^{+2}$) ions, are oxidized to produce higher positive-valence metal ions, such as ferric ($Fe^{+3}$) ions. Ferrous ion oxidation is biocatalyzed by autotrophic iron-oxidizing bacteria, preferably growing in a biofilm. Nutrients and air (and/or oxygen and/or carbon dioxide) are added to the liquid to support the growth of the iron-oxidizing bacteria. In a preferred embodiment, over 90 percent of the oxidized metal ions that participate in oxidation of metal sulfides and sulfur in the anaerobic reactor are produced in this reactor. The liquid containing ferric ions is discharged to the ore or concentrate conditioning tank and/or to the anaerobic reactor. If the separated liquid contains dissolved metal values, they are removed from the liquid by means of cementation or other conventional means before the liquid is discharged to this reactor.

In some embodiments, oxidation of the lower-valence metal ions (i.e., electron donors) is carried out using dissolved molecular oxygen as the primary oxidizing agent (i.e., electron acceptor). The dissolved molecular oxygen is derived from atmospheric air or a pure oxygen source. In other embodiments, oxidation of lower-valence metal ions is carried out using dissolved carbon dioxide gas as the primary electron acceptor. The carbon in the carbon dioxide is reduced (i.e., fixed) by metal-oxidizing bacteria to form more cellular carbon and other forms of biomass (e.g., extracellular polymers). If carbon fixation is performed under aerobic conditions, the carbon dioxide may be obtained from the atmosphere, from dissolution of limestone in an acid or from a source of pure carbon dioxide. If carbon fixation is performed under anaerobic conditions, the carbon dioxide may be obtained from a source of pure carbon dioxide, from dissolution of limestone in an acid or from anaerobic digestion or burning of the biomass produced by carbon fixation. If anaerobic digestion is used to convert the carbonaceous material in the biomass into biogas containing carbon dioxide and methane, the biogas may be burned to convert all of the carbon in it to carbon dioxide.

In that oxidation of ferrous iron to produce ferric iron is an exothermic reaction and produces heat, excess heat must be removed from the system in order to allow it to operate at a relatively constant temperature. At least a portion of the excess heat is removed from the aerobic reactor or from the liquid containing ferric ions prior to the introduction of the liquid. In some embodiments, the excess heat is used elsewhere in the process, e.g., to heat one or more of the anaerobic reactors.

If the separated solids do not contain metal values, they are discharged to a tailings pond, preferably after they are neutralized, for example with limestone and/or lime. If the separated solids contain precious-metal values, such as gold and/or silver values, the solids are conditioned, if necessary, and then leached to extract the precious-metal values. Potential leaching agents include cyanide, bisulfide, thiosulfate, thiourea, iodide, thiocyanate, bromide and chloride. If cyanide or thiosulfate are used to extract gold and/or silver, the solids are neutralized and their pH adjusted to an alkaline range prior to leaching. The extracted (dissolved) precious-metal values are recovered by absorption on activated carbon or an ion-exchange resin or by precipitation (cementation) with copper dust or zinc dust.

In a preferred embodiment, metal-sulfide (e.g., pyrite, arsenopyrite, etc.) oxidation is rapidly carried out under anaerobic conditions indirectly using a leach solution comprising ferric ions (instead of dissolved molecular oxygen) as the oxidizing agent as well as ferrous ions, preferably in a countercurrent upflow, expanded-bed reactor. Oxidation of elemental sulfur particles produced during sulfide oxidation is biocatalyzed by a sulfur-oxidizing bacterium, such as Thiobacillus sp. (*T. ferroaxidans, T. thiooxidans,* etc.) and/or Sulfolobus sp., growing anaerobically in the same reactor. The ferric ions consumed by these reactions are produced (i.e., ferric ions are "regenerated" from ferrous ions) by an oxygenation reaction also biocatalyzed by a metal-oxidizing bacterium, such as Thiobacillus sp. (*T. ferroxidans, T. thiooxiidans,* etc.) and/or Sulfolobus sp., growing aerobically, preferably in a sidestream plug-flow or biofilm reactor, to produce the leach solution. After gold and silver particles are "liberated" in this way, complexation (extraction or solubilization) can be carried out using a conventional (e.g., cyanide) or innovative (e.g., anaerobically produced bisulfide) complexing solution. Dissolved precious metals are recovered from the complexing solution.

In some embodiments, excess leach solution is "bled" off the recirculation loop and introduced to a reactor in which sulfur- and/or sulfate-reducing bacteria are growing. The sulfur- and/or sulfate-reducing bacteria biocatalyze the reduction of the sulfur and sulfate in the solution to produce dissolved sulfides, such as bisulfide ions, and hydrogen sulfide gas and neutralize the solution. A portion of the dissolved sulfides is used to precipitate excess metals in the solution as metal sulfides, a portion is used to produce a complexing solution for extraction of precious metals and a portion is oxidized (preferably biologically) to produce elemental sulfur. The elemental sulfur can be added to the leach solution for biological production of sulfuric acid, if it is required because of the acid-consuming nature of the ore or concentrate.

The present invention offers a number of advantages over the prior-art methods and devices for oxidation of metal sulfides. One object of the invention is to provide for oxidation of metal sulfides without production of a waste gas stream containing sulfur oxides that must be cleaned prior to releasing it to the atmosphere as is the case with roasting. Another object and advantage of the invention is to provide for oxidation of metal sulfides at lower temperatures and pressures than are necessary in autoclaving. Another object of the invention is to increase the energy efficiency and lower the cost of metal sulfide oxidation by reducing or eliminating the requirement for slurry cooling during biocatalyzed oxidation of metal sulfides. Yet another object of the invention is to reduce the amount of energy required to perform oxygenation of ferrous ions. Yet another object of the invention is to reduce or eliminate the need to purchase chemicals for neutralization of bio-oxidation effluents. Further objects and advantages of the invention will become apparent from consideration of the drawings and the ensuing description.

BRIEF DESCRIPTION OF DRAWINGS

The features of the invention will be better understood by referring to the accompanying drawings which illustrate presently preferred embodiments of the invention. In the drawings.

Figure 1:
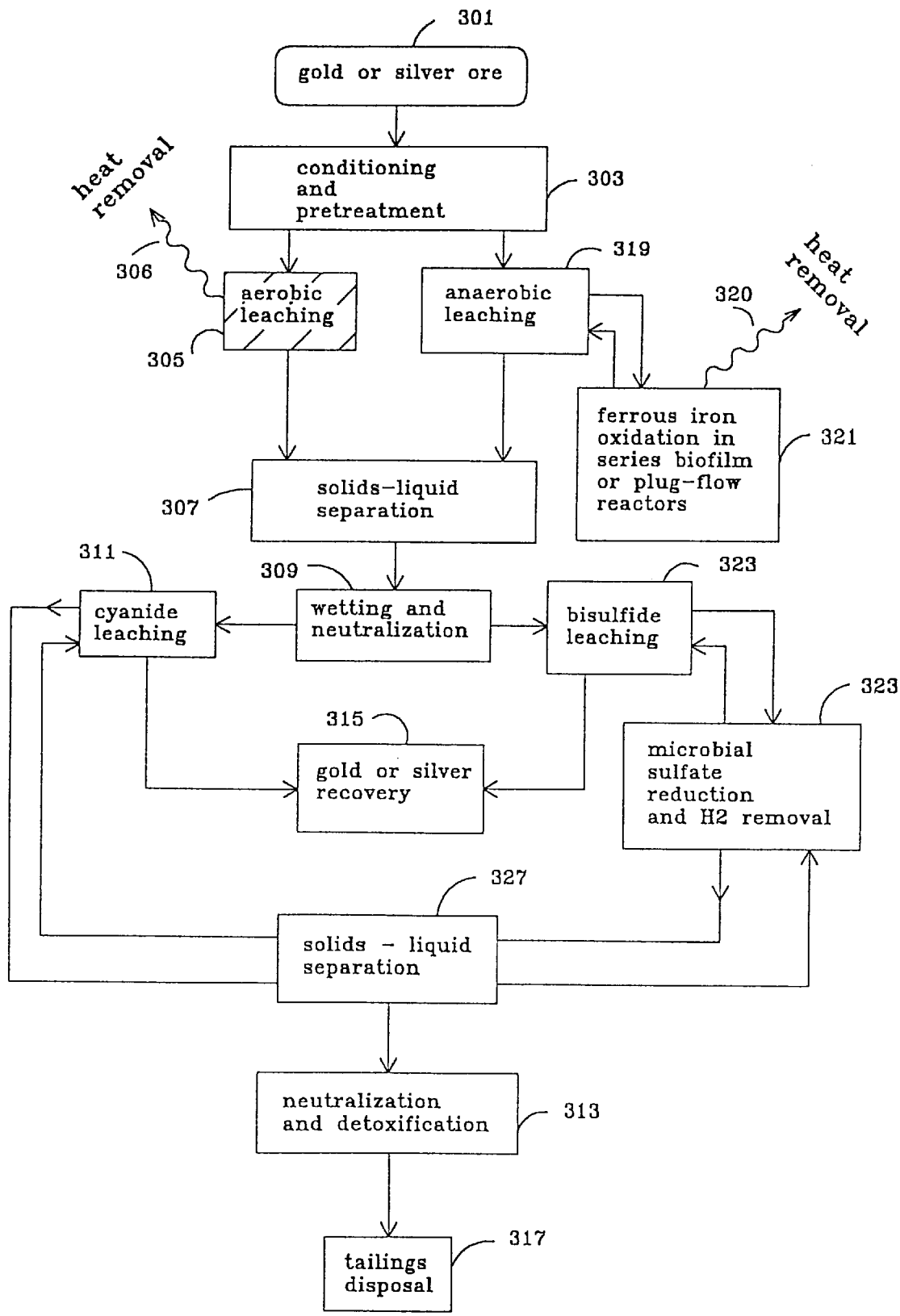
FIG. 1 is a highly schematic block diagram illustrating a comparison of a first representative embodiment of the present invention to the prior art.

The following reference numerals are used to indicate the parts of the invention on the drawings:

```
 1  biocatalyzed anaerobic metal-sulfide oxidation method
    and apparatus
 3  ore or concentrate
 4  metal sulfides
 5  size reduction
 7  conditioning
 9  water or aqueous solution
11  acid
12  slurry
14  nutrients
16  iron- and/or sulfur-oxidizing bacteria
21  regenerated solution
23  metal-ion oxidation
25  anaerobic metal-sulfide leaching, abiotic and biotic
    metal-sulfide oxidation
27  oxidized metal ions
29  iron- and/or sulfur-oxidizing bacteria,
    iron-oxidizing bacteria
35  elemental sulfur
41  solids/liquid separation
43  liquid
45  nutrients
47  oxygen and/or carbon dioxide
51  metal values
53  ion exchange or cementation
61  solids
63  solids separation
65  precious-metals leaching
67  liquid/solids separation
69  precious-metals recovery
71  tailings
101 anaerobic metal-sulfide oxidation reactor, reactor
103 conditioned slurry, slurry
105 circumferential distribution trough
107 reaction zone
109 mixer
121 liquid
123 effluent launderer
125 gases
127 headspace
131 regenerated solution
133 spent solution
145 carbon dioxide gas
147 limestone or lime
151 iron- and/or sulfur-oxidizing bacteria
201 aerobic metal-ion oxidation reactor, reactor
203 spent solution
205 recirculating liquid
207 revolving distributor
209 surfaces
210 iron- and/or sulfur-oxidizing bacteria, bacteria
211 packing
213 recirculation sump, sump
217 liquid
219 nutrients
221 air
223 blower
```

-continued

```
225 carbon dioxide
229 lime
230 centerwell
231 settling tank
233 sludge
241 pump
301 gold or silver ore
303 conditioning and pretreatment step
305 aerobic leaching
306 heat removal, aerobic
307 solids-liquid separation
309 wetting and neutralization
311 cyanide leaching
313 neutralization and detoxification
315 gold or silver recovery
317 tailings disposal
319 anaerobic leaching
320 heat removal, anaerobic
321 ferrous iron oxidation reactor
323 bisulfide leaching
325 microbial sulfate reduction and $H_2$ removal
327 solids-liquid separation
350 first metal sulfide reactor
352 first sulfur oxidation reactor
354 second metal sulfide reactor
356 additional metal sulfide reactors
358 second sulfur oxidation reactor
360 additional sulfur oxidation reactors
401 pyrite concentrate
403 aerobic reactor
405 anaerobic reactor
407 acrylic tube or column
409 expander section
411 effluent collector
413 sampling taps
415 air
416 air pump
417 leaching solution
419 recirculation pump
421 pH controller
423 plug-flow reactor
425 settling well
427 water bath
```

DETAILED DESCRIPTION OF THE INVENTION

Referring to FIG. 1, a highly schematic block diagram illustrating a comparison of a first representative embodiment of the present invention to the prior art is presented. In the conventional bio-catalyzed aerobic precious metals-liberation process, gold or silver ore 301 containing a metal sulfide is conditioned and pretreated in Step 303. Such conditioning and pretreating may include one or more of the following processes: crushing, grinding wetting, pH adjustment, concentration by flotation, and regrinding. The conditioned and pretreated ore or concentrate is then oxidized in Step 305. In said Step 305, gold or silver is liberated from the metal sulfide ore by aerobic oxidation of the ore via reactions which are bio-catalyzed by aerobic, acidophilic, autotrophic bacteria. Step 305 may be implemented in stirred reactors, vats, or heaps. During Step 305, air, oxygen, and/or carbon dioxide (not shown) may be supplied to the ore. In order to protect the bacteria and optimize the reaction rates, heat generated by the reactions is removed from the system in Step 306. After oxidation, the treated ore passes to Step 307 where excess liquid is removed from the slurry. The pH of the slurry is then adjusted in Step 309 as required for cyanide leaching in Step 3 11. In Step 311, precious metal values are dissolved out of the slurry abiotically using cyanide as the leaching agent. The dissolved metal values are then separated from the leached ore in Step 312 and recovered by adsorption or cementation in Step 315. The leached ore solids produced in Step 312 are then neutralized and detoxified in Step 313 prior to disposal in Step 317.

In the proposed anaerobic process, gold or silver ore 301 is conditioned and pretreated in Step 303. Conditioning and pretreatment in Step 303 includes crushing and/or grinding, wetting, pH adjustment, and removal of dissolved oxygen. The slurry is then introduced to a reactor or series of reactors where anaerobic oxidation of the ore slurry occurs in Step 319. Oxidation of the ore "liberates" the precious metal particles from the ore matrix but does not dissolve the precious metals. This anaerobic oxidation process includes oxidation of the metal sulfides and oxidation of the produced elemental sulfur to sulfate. Both of these reactions are catalyzed by anaerobic bacteria such as *Thiobacillus ferrooxidans*. Ferric iron required for the process is supplied by Step 321. Ferrous iron generated in Step 319 is used as a raw material in Step 321. The ferrous—to—ferric iron conversion performed in Step 321 is also bio-catalyzed by anaerobic bacteria. Excess heat produced in Step 319 and Step 321 is removed in Step 320. After the ore has been oxidized in Step 319, excess liquid is removed from the slurry in Step 307. The pH of the slurry is then adjusted in Step 309, and the slurry is introduced into an anaerobic reactor for bisulfide leaching in Step 323. In Step 323, precious metals are dissolved out of the solid ore matrix. Bisulfide ions required for this reaction are supplied by injecting hydrogen sulfide gas which is produced in Step 325. Excess hydrogen gas which is produced in Step 323 is used as a raw product in Step 325 where it is reconverted to hydrogen sulfide gas. Dissolved precious metals are recovered conventionally in Step 315. Spent ore solids are separated from the liquid fraction in Step 327 and discarded conventionally in Step 317.

Figure 2:
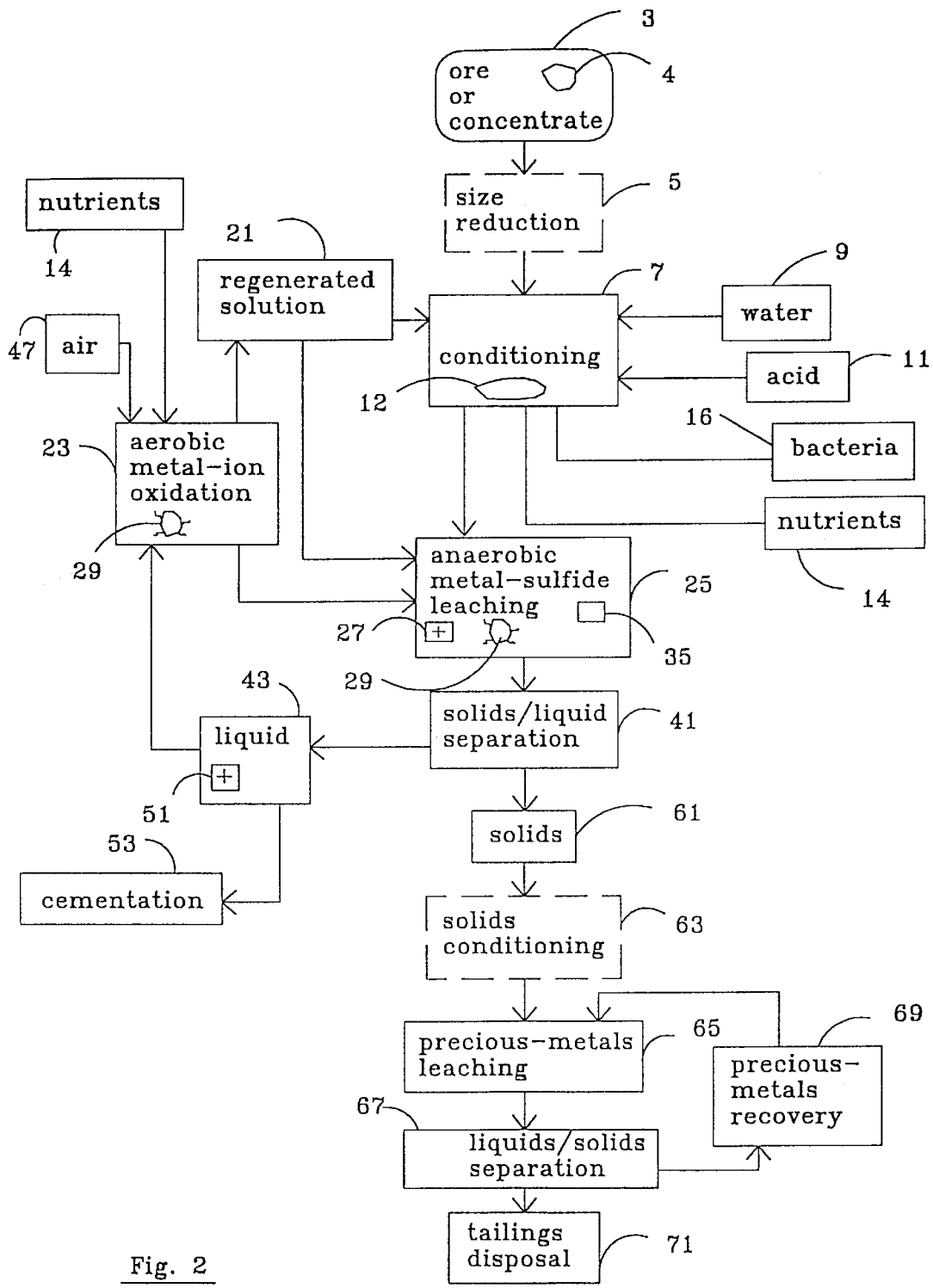
FIG. 2 is a highly schematic block diagram illustrating a second representative embodiment of the present invention.

Referring to FIG. 2, a schematic block diagram of a preferred embodiment of biocatalyzed anaerobic metal-sulfide oxidation method and apparatus I is presented. Ore or concentrate 3 is the input to the process or device. If necessary, ore or concentrate 3 undergoes size reduction 5 (e.g., crushing and/or grinding) to increase the surface area of metal sulfides that can be exposed to lixiviants (leach solutions) and to activate metal sulfides 4, making them more amenable to participating in chemical reactions.

Ore or concentrate 3 then undergoes conditioning 7 which includes wetting with water or aqueous solution 9 and possible p adjustment with acid 11 to produce slurry 12. Alternatively, crushed and or ground ore or concentrate 3 is conditioned with regenerated solution 21 produced by aerobic metal-ion oxidation 23. If necessary, nutrients 14, such as nitrogen and phosphorus, and/or iron- and/or sulfur-oxidizing bacteria 16 are added to slurry 12 during conditioning 7. During conditioning 7, molecular oxygen is excluded from slurry 12 and/or molecular oxygen present in slurry 12 is consumed by chemical reactions and facultative aerobic microorganisms, such as iron- and/or sulfur-oxidizing bacteria 16.

Conditioned ore or concentrate 3 in slurry 12 then undergoes anaerobic metal-sulfide leaching 25. During anaerobic metal-sulfide leaching 25, metal sulfides, such as pyrite arsenopyrite, etc., ore oxidized in the absence of molecular oxygen by oxidized metal ions 27 by iron- and/or sulfur-oxidizing bacteria 29 growing in association with heterotrophic bacteria. Also elemental sulfur 35 present in ore or concentrate 3 or produced during oxidation of metal sulfides 4 is oxidized anaerobically in a reaction biocatalyzed by sulfur-oxidizing bacteria. If metal-sulfide leaching 25 is operated at mesophilic temperatures (around 35° C.), iron- and/or sulfur-oxidizing bacteria 29 is *Thiobacillus ferrooxidans* (ATCC 13598, ATCC 13661, ATCC 14119, or ATCC 19859) or a similar microorganism. If metal-sulfide leaching 25 is operated at thermophilic temperatures (around 70° C.), iron- and/or sulfur-oxidizing bacteria 29 is Sulfolobus sp. (ATCC 33909, ATCC 49426, ATCC 35091) or a similar microorganisms. These and similar microorganisms are on deposit at the American Type Culture Collection, 12301 Parklawn Drive, Rockville, Md. 20852, USA. Anaerobic metal-sulfide leaching may be operated in one or more of the following modes: counter-current, upflow tank leaching; agitated tank leaching; heap leaching; dump leaching or vat leaching, etc.

If liquid 43 contains soluble metal values 51 (e.g., $Cu^{+2}$, $Zn^{+2}$, etc.), they are recovered from liquid 43, preferably by ion exchange or cementation 53. In cementation, $Cu^{+2}$ is recovered in an oxidation-reduction reaction by its chemical reduction (addition of electrons) on scrap iron which undergoes oxidation (loss of electrons), thereby increasing the concentration of $Fe^{+2}$ in liquid 43.

Metal ions in liquid 43 undergoes metal-ion oxidation 23. Metal-ion oxidation 23 is accomplished by iron-oxidizing bacteria 29 growing in association with heterotrophic bacteria. In some embodiments, aerobic oxidation of elemental sulfur in liquid 43 is accomplished by *Thiobacillus thiooxidans* growing a pH values approaching zero. Nutrients 45 and/or air and/or oxygen and/or carbon dioxide 47 are added to support growth of iron-oxidizing bacteria 29. In a preferred embodiment sufficient metal-ion oxidation occurs to support the desired degree of abiotic and biotic metal-sulfide oxidation 25.

If required, solids 61 separated during solids/liquid separation 41 undergo solids conditioning 63. For example, solids conditioning could be neutralization and pH elevation to an alkaline range with limestone, lime, and/or sodium hydroxide, if cyanidation or thiosulfate leaching are used to accomplish precious-metals leaching 65. Following precious-metals leaching 65, by means of cyanide leaching, thiosulfate leaching, thiourea leaching or bisulfide leaching, etc., liquid/solids separation 67 occurs. The liquid undergoes precious-metals recovery 69 (e.g., by absorption on activated carbon or precipitation on zinc) and the solids are disposed of as tailings 71.

In the present invention, an analysis of enthalpy changes (ΔN) can be used to develop an understanding of heat generated or consumed by chemical reactions. The basic relationship is as follows:

$$\Delta H_{reaction} = \Delta H_{f,products} - \Delta H_{f,reactants}$$

where $\Delta H_{reaction}$=enthalphy generated or consumed by the reaction $\Delta H_{f,prducts}$=enthalphy of formation of the products of the reaction $\Delta H_{f,reactants}$=enthalphy of formation of the reactants of the reaction Information on chemical thermodynamic properties of elements at 25° C. is available from a variety of sources (e.g., Wagman, D. D., Evans, W. H., Parker, V. B., Halow, I., Bailey, S. M., & Schumm, R. H., "Selected Values of Chemical Thermodynamic properties," *NBS Technical Note.* 270–3, U.S. Department of Commerce, 1958; Thauer, R. K., Jungermann, K., & Decker, K. "Energy conservation in chemotrophic anaerobic bacteria," *Bacteriol. Rev.,* 41, 100–180, 1977).

For example, conventional (direct), agitated-tank, bio-oxidation reactors used to liberate gold from pyrite concentrates are designed to accomplish the following direct (aerobic) pyrite oxidation reaction:

$$2FeS_2 + 7O_{2(aq)} + 2H_2O \rightarrow 2Fe^{+3} + 4SO_4^{-2} + 4H^+$$

The enthalpy changes associated with this reaction are summarized in the first column of Table 1. Some 1,402.75 kJ of heat are generated and must be removed from the slurry undergoing bio-oxidation for each mole of pyrite oxidized at 25° C. To put this in perspective, on an average day, a plant bio-oxidizing 1,000 tons per day of pyrite would have to dispose of 20 times the amount of energy consumed by the District of Columbia on an average day.

Pyrite oxidation can also be accomplished indirectly (anaerobically or anoxically in the absence of dissolved molecular oxygen) by means a reaction conventionally represented as follows:

$$FeS_2 + 14Fe^{+3} + 8H_2O \rightarrow 15Fe^{+2} + 2SO_4^{-2} + 16H^+$$

The ferric ($Fe^{+3}$) ions required as reactants can be produced (in the presence of dissolved oxygen) by the following aerobic biocatalyzed reaction:

$$8Fe^{+2} + 2O_{2(aq)} + 8H^+ \rightarrow 8Fe^{+3} + 4H_2O$$

The enthalpy changes associated with these reactions are also summarized in Table 1. As one would expect, the same amount of heat must be removed from the system for each mole of pyrite oxidized for with either aerobic and anaerobic leaching.

With the present invention, heat can (and is) removed from the aerobic portion of the system in which ferrous iron is oxidized (regenerated) because it is in that portion of the system that almost all of the heat is generated. This approach offers the advantages associated with removing heat from a liquid instead of a slurry, e.g., less clogging of heat exchanger passages, less equipment wear, etc. Moreover, if a "trickling filter" type biofilm reactor is used for ferrous iron oxidation with thin sheets of liquid flowing over surfaces in the reactor (as has been used in copper-ore leaching applications), cooling of the system could be greatly facilitated.

In addition, if the microbial cells are "recycled" and used repeatedly to biocatalyze the oxidation reaction, less heat need be generated by oxidation of the additional ferrous iron that would otherwise be oxidized to provide energy for cell growth (i.e., carbon fixation). In conventional (direct oxidation, aerobic) systems, the cells that accomplish the bio-oxidation are lost when the slurry particles on which they are attached leave the system and must be re-grown anew. in that about 20 percent of the energy yield of the ferrous iron oxidation reaction is used to fix carbon MacDonald, D. G. & Clark, R. H. "The Oxidation of Aqueous Ferris Sulphate by *Thiobacillus ferrooxidans,*" *Can J Chem. Eng.* 669, 1970), the amount of ferrous iron oxidized (and heat produced) can be reduced by up to 20 percent, if cell regeneration is not required. While in direct bio-oxidation "recycling" of oxidized slurry is "generally not recommended because concentrations of undesirable solution species are increased, in some cases to undesirable levels, resulting in a decrease in bacterial activity" (Marsden, J. & House, I., *The Chemistry of Gold Extraction,* New York: Ellis Horwood, 1993), this problem does not occur with present invention because an appropriate leach solution bleed-down and/or precipitation step is provided, if required.

Use of a static biofilm reactor for ferric ion production allows a significant energy cost savings. An the wastewater treatment field, it has been shown that using trickling filter type biofilm reactors can reduce energy requirements for oxygenation and mixing of dilute slurries of organic material by 35 percent and 44 percent compared to plug-flow, agitated reactors and rotating biological contactor reactors, respectively (Parker, D. S., Fedotoff, R. C., & Doyle, A. A., "The Trickling Filter/Solids Contact Process to Conventional Technology," *Engineering-Economic Comparison.* CA: Brown & Caldwell, 1981).

TABLE 1

Enthalpy Changes Associated with Pyrite Oxidation

| Compounds/ elements Products | Enthalpy of formation, kJ/mole | Direct bio-oxidation enthalpy change, kJ | Indirect bio-oxidation enthalpy change, kJ | |
|---|---|---|---|---|
| | | | Pyrite oxidation | Ferrous iron oxidation |
| $Fe^{+2}$ | −89.12 | −178.24 | −1,336.80 | |
| $Fe^{+3}$ | −48.53 | | | −388.24 |
| $SO_4^{-2}$ | −909.34 | −3,636.36 | −1,818.68 | |
| $H^+$ | 0 | 0 | 0 | |
| $H_2O$ | −285.83 | | | −1,143.32 |
| Reactants | | | | |
| $FeS_2$ | −178.2 | −356.40 | −178.2 | |
| $O_{2(aq)}$ | −11.72 | −82.04 | | −23.44 |
| $H_2O$ | −285.83 | −571.66 | −2286.64 | |
| $Fe^{+3}$ | −48.53 | | −679.42 | |
| $Fe^{+2}$ | | | | −717.96 |
| $\Delta H_{reaction}$ | | −2,805.50 | −11.22 | −795.16 |
| $\Delta H_{reaction}$ per mole of $FeS_2$ oxidized | | −1,402.75 | | −1,402.75 |

Analysis of free energy changes that occur during biocatalysis of chemical reactions is also integral to design of specific embodiments of the present invention. From an anthropomorphic perspective, free energy changes reflect "what's in it for the bacteria" in catalyzing a particular reaction. This information is useful in developing mathematical models of bioprocesses that often requires estimates of the following model parameters: $\mu_{max}$=maximum specific growth rate, $K_s$=half saturation constant, $Y_g$=growth yield, and b=maintenance coefficient.

Work by a variety of researchers including McCarty, P. L. in "Energetics and Bacterial Growth. In S. D. Faust and J. V. Hunter (Eds.)," (*Organic Compounds in Aquatic Environments.* NY: Marcel Dekker, Inc., 1971), Van der Meer, R., Westerhoff, H .V., & Van Dam, K. in "Linear relation between rate and thermodynamic force in enzyme-catalyzed reactions," (*Biochemical et Biophysical Acta.* 591, 488–493, 1980), Roels, J. A. in "Simple model for the energetics of growth on substrates with different degrees of reduction," (*Biotech. Bioeng.,* 22, 33–53, 1980), and Westerhoff, H. V., Hellingwerf, K. J., Van Dam, K. in "Thermodynamic efficiency of microbial growth is low but optimal for maximal growth rate," (*Pro. Natl. Acad. Sci. USA,* 80, 305–309, 1983) has shown that free energy changes can be used to estimate both $\mu_{max}$ and $K_s$ as well as $Y_g$ in the absence of growth studies. The average growth yield of the multiple-species/multiple-substrate aerobic activated sludge system, for example, has been found to be directly proportional to the average free energy change of oxidation as follows (Servizi and Bogan, 1964):

$$Y_{avg} = -K^* \Delta G^0{}_{avg}$$

where

Y$_{avg}$=biomass yield, gram of biomass per mole of substrate utilized $\Delta G^0{}_{avg}$=average standard free energy change for oxidation of substrates, k/mole K=a constant A similar relationship over a wide range of specific electron donors and electron acceptors has been presented by Snoeyink and Jenkins (1980). Using data from McCarty (1971), they illustrated the relationship between microbial cell yield [expressed in equivalents of cell material formed per equivalent of electrons (electron mole) transferred in substrate oxidation] and the free energy change associated with substrate oxidation (expressed as $\Delta G$ per electron equivalent of substrate oxidized). With an empirical cell formulation of $C_5H_7O_2N$, the weight of cell material formed per electron transferred was determined to be 113/20 or 5.65 grams of cells per electron mole.

Wile free energy changes have often been correlated with biomass yields (Bailey and Ollis, 1986), both Middleton and Lawrence (1977) and Snoeyink and Jenkins (1980) have pointed out that the maximum rate at which various microorganisms can grow ($\mu_{max}$) is correlated with the energy available from the redox reaction that is catalyzed. For example, the maximum specific growth rates associated with the following microbially catalyzed reactions are clearly correlated with a progressively lower amount of energy available to the microorganisms from substrate oxidation: aerobic heterotrophic oxidation, heterotrophic denitrification, nitrate oxidation, ammonium oxidation, heterotrophic sulfate reduction, and heterotrophic methane fermentation.

McCarty (1971) provided a theoretical explanation of the correlation. He showed that if the magnitude of the maintenance coefficient (b) is sufficiently small, $$\mu_{max} = k_m{}^* Y_m$$

where $k_m$=electron transport rate, electron moles transferred for energy per gram of bacteria per hour $Y_m$=maximum yield factor, units of biomass formed per unit of energy source consumed, if no energy is required for maintenance; expressed in grams of bacteria synthesized per mole of electrons transferred in the oxidation-reduction reaction Furthermore, he noted that $k_m$ can be assumed to be a temperature-dependent constant having a value between 0.04 and 0.08 electron moles/gram-hr at 25° C. Thus, energetics data are also helpful in developing a relative, qualitative understanding of the kinetics of microbially mediated transformations.

With the present invention, this approach is used is to predict the capabilities of Thiobacillus ferrooxidans with respect to the oxidation of elemental sulfur produced during bio-oxidation under aerobic versus anaerobic conditions. Oxidation of elemental sulfur is particularly important is gold ore pretreatment applications, because sulfur is produced by the following indirect pyrite oxidation reaction:

$$FeS_2 + 2Fe^{+3} + 3SO_4{}^{-2} \rightarrow 3Fe^{+2} + 3SO_4{}^{-2} + 2S^0$$

This sulfur can coat "liberated" gold particles, thereby reducing extraction efficiency. Its presence can also significantly increase the consumption of leaching agents, such as cyanide, thereby increasing the cost of gold recovery. Thiobacillus ferrooxidans catalyzes the following sulfur-oxidation reaction aerobic conditions:

$$2S^0 + 3O_{2(sq)} + 2H_2O \rightarrow 2SO_4{}^{-2} + 4H^+$$

The same bacterium catalyzes the following sulfur-oxidation reaction under anaerobic conditions:

$$S^0 + 6Fe^{+3} + 4H_2O \rightarrow 6Fe^{+2} + SO_4{}^{-2} + 8H^+$$

Such an analysis of free energy changes at 25° C. is presented in Table 2. It reveals that Thiobacillus ferrooxidans can obtain about the same amount of energy (or a little more) from anaerobic oxidation of sulfur (under physiologic conditions) as it can from aerobic sulfur oxidation. Therefore, the microorganism should grow at about the same (or greater) rate under anaerobic conditions as it does under aerobic conditions. This is confirmed by the findings of Pronk, J. T., de Bruyn, J. C., Bos, P., & Kuenen, J. G. in "Anaerobic growth of Thiobacillus ferrooxidans," (Applied and Environmental Microbiology, 58. 2227–2230, 1992), who noted that for Thiobacillus ferroaxidans growth on elemental sulfur "the anaerobic growth rate of approximately 0.03 hr$^{-1}$ is of the same order of magnitude as the aerobic growth rate on a number of sulfur compounds." They reported a doubling time of about 24 hours for growth on elemental sulfur under anaerobic conditions and were careful to release cells attached to sulfur particles prior to counting. This can be contrasted with the doubling times for aerobic growth on elemental sulfur reported by C. J. M. McGoran, D. W. Duncan, and C. C. Walden, in "Growth or Thiobacillus ferrooxidans on various substrates," (Can. J. Microbiol. 15: 135–138. 1969) that ranged from 168 to 192 hours based on measurements of free and attached bacterial nitrogen. They concluded that growth studies in which simple direct microscope counting techniques were used [e.g., those by Unz, R. F. & Lundgren, D. G. in "A Comparative Nutritional Study of Three Chemoautotrophic Bacteria: Ferrobacillus ferrooxidans,, Thiobacillus ferrooxidans, and Thiobacillus thiooxidans," (Soil Science, 92. 302–313, 1961), which reported aerobic-growth doubling times that ranged from 10 to 20 hours] were invalid in that reported doubling times were significantly lower than actual.

This is important because it shows that elemental sulfur is unlikely to build up more rapidly on particle surfaces in an anaerobic metal-sulfide oxidation system (compared to an aerobic system), coating gold particles and preventing their dissolution in a subsequent extraction step. Moreover, while the indirect pyrite oxidation reaction as is conventionally represented produces sulfate as a product in one step as noted above, over ninety years ago Stokes, H. N. in Pyrite and Marcasite (U.S. Geological Survey, Washington Printing Press, 1901) and recently Gupta, C. K., & Mukherjee, T. K. in Hydrometallurgy in Extraction Processes, Vol. I & II. (Boston: CRC Press, 1990) proposed that it is really the case that the two independent reactions occur. Thus, with pyrite oxidation, elemental sulfur is produced as an intermediary (as is known to be the case the case with other metal sulfides, such as copper sulfides, lead sulfides and zinc sulfides) as follows:

$$FeS_2 + 2Fe^{+3} + 3SO_4{}^{-2} \rightarrow 3Fe^{+2} + 3SO_4{}^{-2} + 2S^0 2S^0 + 12Fe^{+3} + 18SO_4{}^{-2} + 8H_2O \rightarrow 12Fe^{+2} + 20SO_4{}^{-2} + 16H^+$$

Hence, oxidation of elemental sulfur is a rate-limiting step in all types of indirect metal-sulfide oxidation, even that which occurs during conventional, aerobic bio-oxidation. Since optimized anaerobic, biotic oxidation of elemental sulfur may proceed more rapidly than aerobic, biotic oxidation of elemental sulfur, the anaerobic, biotic approach of the present invention offers kinetic advantages as well. It appears to solve the problem of "formation of a protective sulfur layer on the sulfide surface during leaching" that plagues abiotic pyrite leaching with ferric sulfate solutions and ferric chloride solutions (Gupta, C. K., & Mukhedee, T. K., *Hydrometallurgy in Extraction Processes, Vol. I & II.* Boston: CRC Press, 1990).

TABLE 2

Free Energy Changes Associated with Elemental Sulfur Oxidation

| Compounds/ elements Products | Free energy of formation, kJ/mole | Aerobic sulfur oxidation free energy change, kJ | Anaerobic sulfur oxidation free energy change, kJ |
|---|---|---|---|
| $Fe^{+2}$ | −89.12 | | −473.22 |
| $SO_4^{-2}$ | −909.34 | −1,489.26 | −744.63 |
| $H^+$ | 0 | 0 | 0 |
| Reactants | | | |
| $S^0$ | 0 | | 0 |
| $O_{2(aq)}$ | −11.72 | −86.70 | |
| $H_2O$ | −285.83 | −474.36 | −948.71 |
| $Fe^{+3}$ | −48.53 | | −27.60 |
| $\Delta G^{\circ}_{reaction}$ | | −928.20 | −241.55 |
| Adjustment to pH 7.0 | | −159.48 | −318.96 |
| $\Delta G^{\circ'}_{reaction}$ | | −1,087.68 | −560.51 |
| $\Delta GD^{\circ'}_{reaction}$ per mole of electrons transferred oxidized | | −90.64 | −93.42 |

In the present invention, the reactor engineering approach is used to optimize bioprocess designs. Reactor engineering was described by Grady, C. P. L., Jr. & Lim, H. C. in *Biological Wastewater Treatment.* (NY: Marcel Dekker, 1989) as follows:

"Reactor engineering is based on the premise that, if the kinetics of a reaction can be expressed mathematically, then it is possible to investigate the impact of reactor type and configuration on the extent of reaction through application of mathematical models that incorporate both transport and reaction terms."

Reliance on process modeling offers a number of advantages to research efforts of this type. First, development of the model in the early stages of the project facilitates design of experimental apparatus and procedures. Second, the model provides a framework for understanding (and optimizing) the microbiology of the system under study. Finally, a calibrated bioprocess model is a valuable tool for investigating application for and scale up of knowledge gained during research.

In one embodiment of the invention, a reactor engineering analysis of aerobic ferrous iron oxidation (oxygenation). While it is common knowledge in the hydrometallurgical community that ferrous iron oxidation results in acidification of the aqueous medium in which the oxidation is occurring, no one appears to have investigated the implications of the fact that a series of reactions is involved. The first is the following, rapid, biocatalyzed reaction:

$$4Fe^{+2} + O_{2(aq)} + H^+ \rightarrow 4Fe^{+3} + 2H_2O$$

The second is conventionally represented as the following slower, abiotic, hydrolysis reaction:

$$Fe^{+3} + 3OH^- \rightarrow Fe(OH)_3$$

These reactions can be analyzed as two reactions in series. Assuming for simplicity in this analysis that both reactions are first order reactions with rate constants $k_1$ and $k_2$, then they can be represented as follows:

$$Fe^{+2} \xrightarrow{k_1} Fe^{+3} \xrightarrow{k_2} Fe(OH)_3$$

or $$A \xrightarrow{k_1} B \xrightarrow{k_2} C$$

Because, in prior-art processes, the oxidation of ferrous ions produces acidity in excess of that amount required for leaching (i.e., for consumption in the first, biotic reaction) the excess acidity must then neutralized in some way and at typically significant cost. In a reactor designed in accordance with the present invention, there is an optimum space time (reactor detention time or reaction time), $\tau_m$, at which the highest concentration of B is obtained. For a single batch reactor (or a plug flow reactor) the optimum space time can be shown to be as follows (Grady, C. P. L., Jr. & Lim, H. C., *Biological Wastewater Treatment.* NY: Marcel Dekker, 1980):

$$\tau_m = [ln(k_2/k_1)]/(k_2 - k_1)$$

Similarly, for a single continuous stirred tank reactor (CSTR) the optimum space time can be shown to be as follows (Grady, C. P. L., Jr. & Lim, H. C., *Biological Wastewater Treatment.* NY: Marcel Dekker, 1980):

$$\tau_m = 1/(k_2 * k_1)^{0.5}$$

The ratio of the maximum concentration of B ($C_{Bm}$) to that of the initial concentration of A ($C_{A0}$) is always greater for a batch reactor or plug flow reactor than it is for a CSTR. The difference is higher with increasing values of $k_1/k_2$. For this reason, in one embodiment of the present invention, ferrous iron is oxygenated in a plug flow reactor due to the potential advantages in significantly reducing reagent costs and sludge production rates with this reactor design.

While many investigators have found that the presence of iron-oxidizing bacteria significantly increase the rate of metal-sulfide oxidation under aerobic conditions over that of sterile controls, no one has investigated whether it has a similar effect under anaerobic conditions at high ferric ion concentrations. Moreover, because both oxidation reactions are diffusion controlled, even though the ferric ion has a lower diffusion rate (0.604 *$10^{-5}$ $cm^2/s$) than dissolved oxygen (2.41*$10^{-5}$ $cm^2/s$), much higher concentrations of ferric ions can be achieved at the boundary layer/bulk solution interface than can be achieved with dissolved oxygen, simply because of the much higher solubility of ferric sulfate.

Rate (kinetic) data and stoichiometric data for oxidation of ferrous iron by *Thiobacillus ferrooxidans* are available. Chavarie, C., Karamanev, D., Godard, F., Garnier, A., & Andre, G. in "Comparison of the kinetics of ferrous iron oxidation by three different strains of *Thiobacillus*

*ferrooxidans*," (*Geomicrobiology Journal*, 11, 57–63, 1993), reported that the organism's growth between 20 to 32° C. can be characterized with Mond kinetics [$\mu=\mu_{max}*S/(K_s+S)$] with a maximum specific growth rate ($\mu_{max}$) of 0.14 hr$^{-1}$ and a half saturation constant ($K_s$) of 400 mg Fe$^{+2}$/l. In situations where $K_s$>>S, a first order reaction rate coefficient ($k_1=\mu_{max}/K_s$) of about 0.00035 mg Fe$^{+2}$/*h can be used. At this rate, ferrous ion concentrations can be reduced by an order of magnitude in a few hours.

Although literature is replete with discussions of Fe(OH)$_3$ chemistry, the compound Fe(OH)$_3$ is really a convenient fiction. Budavari, S. (Ed.) in *The Merk Index* (Rahway, N.J.: Merk & Co., Inc., p. 632, 1989) states that "the hydroxide Fe(OH)$_3$ is not known." Rather, it defines "ferric hydroxide" as FeO(OH). The actual ferric iron hydrolysis reaction has been shown to be as follows (Biedermann. G. & Schindler, P., "On the Solubility Product of Precipitation Iron(III) Hydroxide." *ACTA Chemical Scandinavica* 11. 731–740, 1957):

$$Fe^{+3}+2H_2O \rightarrow FeO(OH)_{(s)}+3H^+$$

This reaction rate is "slow at room temperature" and can take 200 hours to reach equilibrium in the pH range 1.7 to 2.7 (Biedermann. G. & Schindler, P., "On the Solubility Product of Precipitation Iron(III) Hydroxide." *ACTA Chemical Scandinavica* 11. 731–740, 1957). A variety of complexes are also formed in other hydrolysis reactions.

In studying the above hydrolysis reaction, Evans, U. R. & Pryor, M. J. in *The Passivity of Metals. Part IX. The Solubility Product of Freshly Precipitated Ferric Hydroxide.* (Dept. Of Metallurgy, Cambridge Univ, 1949) showed that "gelatinous ferric hydroxide" did not even begin to precipitate until a pH of 3.0 was reached. For this reason, in the present invention, the process is optimally operated at a lower pH (1.0 to 1.8). Similarly, Lamb, A. B. & Jacques, A. G. in "The Slow Hydrolysis of Ferric Chloride in Dilute Solution. 1. The Change Conductance, Color and Chloride Ion Concentration," (*Hydrolysis of Ferric Chloride in Dilute Solution, Vol.* 60. 967–981, 1938), documented a marked inverse effect of Fe$_2$(SO$_4$)$_3$ concentration on the rate of the hydrolysis reaction. They also noted that temperature increases from 25 to 35° C. increased the rate of hydrolysis significantly. Wells, R. C. in "The Electrical Conductivity of Ferric Sulphate Solution," (*General, Physics, and Organic.* 1027–1035, 1909), showed that the rate decreased over the Fe$_2$(SO$_4$)$_3$ concentration range of 220 mg/l to 660 mg/l. Thus, in the present invention, the process is optimally operated at a relatively high ferric ion concentration (e.g., grams per liter) and a relatively low temperature (e.g., 25 to 35° C.).

For example, if both reactions were first order reaction and $k_1/k_2$=2, the above equations could be used to predict a $C_{Bm}/C_{A0}$ of 0.5 for a plug flow reactor and 0.34 for a CSTR. Thus, less excess acid (which will eventually required neutralization) would be produced in a system in which ferrous iron was oxygenated in a plug flow reactor rather than in a CSTR, in situations in which relatively rapid downstream "indirect" metal sulfide oxidation reaction consumes ferric ions before hydrolysis occurs.

Figure 3:
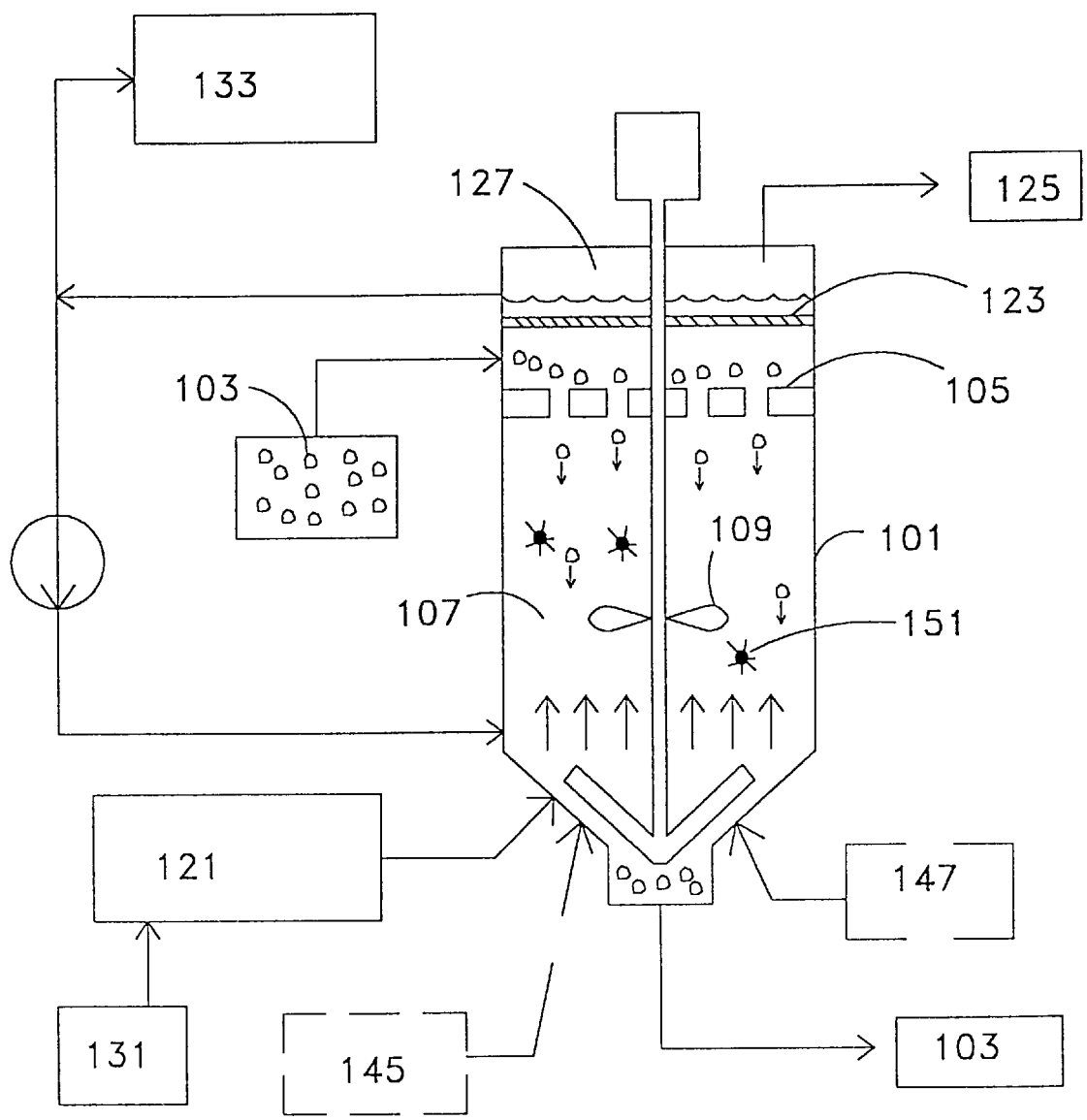
FIG. 3 is a highly schematic vertical cross-sectional drawing of a preferred design of anaerobic metal-sulfide oxidation reactor.

Referring FIG. 3, a schematic vertical cross-selectional drawing of a preferred design of anaerobic metal-sulfide oxidation reactor 101 is presented. Conditioned slurry 103 is introduced to circumferential distribution trough 105 which slurry 103 fills and overflows and sinks downward into reaction zone 107. In some embodiments, mixer 109 ensures mixing of slurry 103 in reaction zone 107. Liquid 121 is introduced at the bottom of reactor 101 and is withdrawn at the top of reactor 101 by flowing over and into effluent launderer 123. Gases 125 generated or released in reactor 101 accumulate in headspace 127 and are released as required.

In a preferred embodiment, liquid is recirculated through reactor 101 at a high enough rate to provide complete mixing of reaction zone 107. Regenerated solution 131 which contains high concentrations of oxidized metal ions (e.g., Fe$^{+3}$, Cu$^{+2}$, etc.) is added to liquid 121 before liquid 121 enters reactor 101. A portion of liquid 121 removed at the top of reactor 101 is removed from the system as spent solution 133. Spent solution 133 is processed to convert lower positive-valence metal ions in an aerobic reactor (not shown). Slurry 103 containing oxidized metal sulfides is removed from the bottom of the reactor 101.

In one embodiment reactor 101 is operated in a counter-current, fluidized-bed, upward flow reactor mode. In this mode, the slurry at the bottom of reaction zone 107 containing the lowest concentration of metal-sulfide ions is exposed to the highest ferric (Fe$^{+3}$) ion concentration. The slurry at the top of reaction zone 107 containing the highest concentration of metal-sulfide ions is exposed to the lowest ferric ion concentration because conversion of (reduction) ferric ions to ferrous ions has occurred lower in reactor 101.

Regenerated solution 131 contains iron-oxidizing bacteria which serve to inoculate reactor 101 with bacteria that colonize the surfaces of ore or concentrate particles in slurry. In some embodiments, carbon dioxide gas is added to the bottom of reactor 101 for fixing of carbon (conversion of carbon dioxide to bacterial calls) by the iron-oxidizing bacteria under anaerobic conditions. In other embodiments, carbon is added to reactor 101 in solid form as limestone or lime 147. Iron-and/or sulfur-oxidizing bacteria 151 accelerate the oxidation of metal sulfides and oxidize elemental sulfur released by some sulfide-oxidation reactions. Iron-and/or sulfur-oxidizing bacteria 151 also consume hydrogen sulfide produced in reactor 101.

Figure 4:
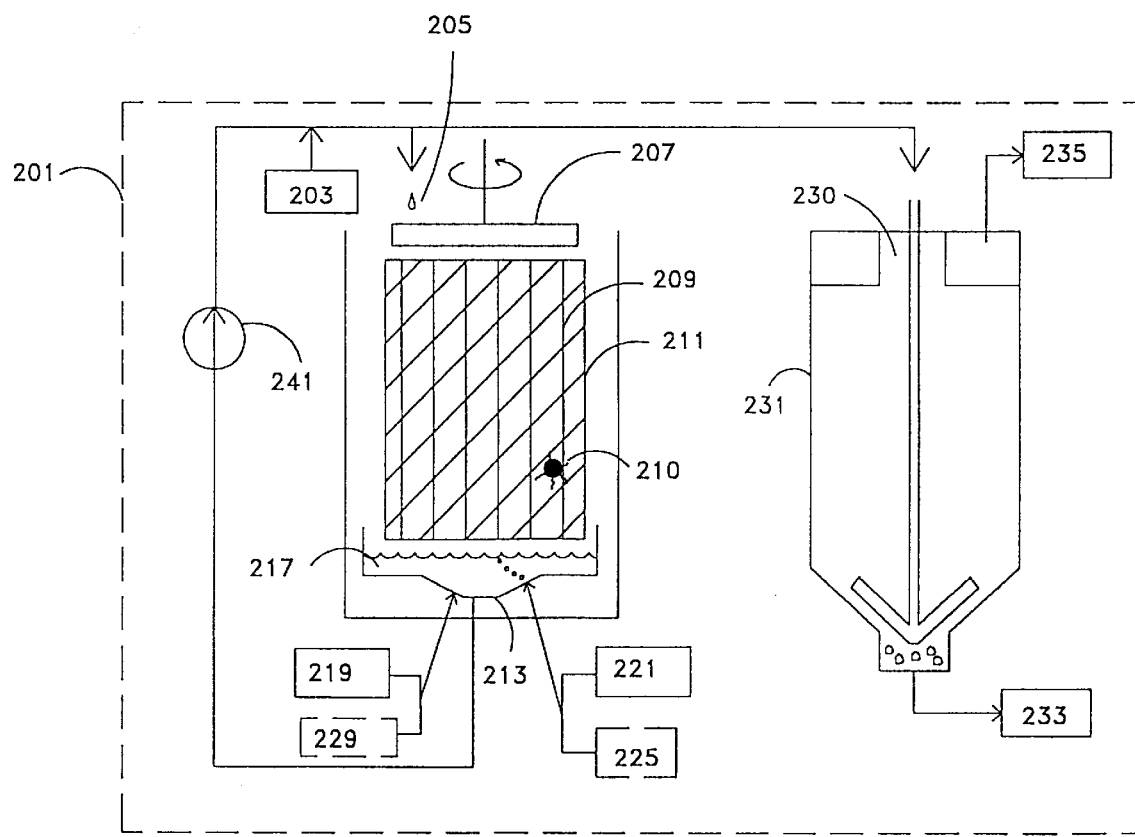
FIG. 4 is a highly schematic vertical cross-sectional drawing of a preferred design of aerobic metal-ion oxidation reactor.

Referring to FIG. 4, a schematic vertical cross-sectional drawing of a preferred design of aerobic metal-ion oxidation reactor 201 is presented. In this embodiment, the relatively reduced (less oxidized) metal ions in spent solution 203 (e.g., Fe$^{+2}$) are oxidized to form relatively more oxidized metal ions (e.g., Fe$^{+3}$). Suspended particles of elemental sulfur (S$^0$) is also oxidized to form sulfate ions (SO$_4^{-2}$).

Reactor 201 is operated in an aerobic trickling filter mode. In this mode, recirculating liquid 205 containing spent solution 203 is introduced to the top of reactor 201 by means of revolving distributor 207. Liquid 205 trickles down the surfaces 209 of packing 211 and into recirculation sump 213. Packing 21 1 has a high surface-area to volume ratio. Iron-and/or sulfur-oxidizing bacteria 210 grow on surfaces 209 in a biofilm configuration. A biofilm is a film that adheres to a surface that comprises living microorganism cells, water and other materials.

If necessary, nutrients 219 and/or air 221 are added to liquid 217 in sump 213. In a preferred embodiment air 221 is discharged into the bottom of reactor 201 by blower 223. This air flows upward through packing 211 and provides oxygen and carbon dioxide to iron- and/or sulfur-oxidizing bacteria 210 growing on surfaces 209. If necessary, carbon dioxide 225 is also introduced into reactor 201 by mixing it with air 221 or by mixing lime 229 with liquid 217. Liquid 217 is recirculated to the top of reactor 201 by pump 241.

During normal operation, a portion of iron- and/or sulfur-oxidizing bacteria 210 will slough off of surfaces 209 and become suspended in liquids 217 and 205. In one embodiment, bacteria 210 in liquid 205 are returned to the conditioning and/or metal-sulfide oxidation reactors(not shown) as regenerated solution 235. In a preferred embodiment, bacteria 201 in liquid 205 are introduced to centerwell 230 of settling tank 231. Solids settle to the bottom of the tank and are removed as sludge 233. Regenerated solution 235 is returned to the conditioning and/or metal-sulfide oxidation reactors (not shown).

Excess heat (i.e., heat generated by production of regenerated solution 235 in excess of the heat requirements of the process) is removed from liquid 205, liquid 217 and/or regenerated solution 235. This excess heat may be transferred to a liquid, such as water, for use elsewhere, or it may be disposed of to the atmosphere or to a body of water.

WORKING EXAMPLE NO. 1

Figure 5:
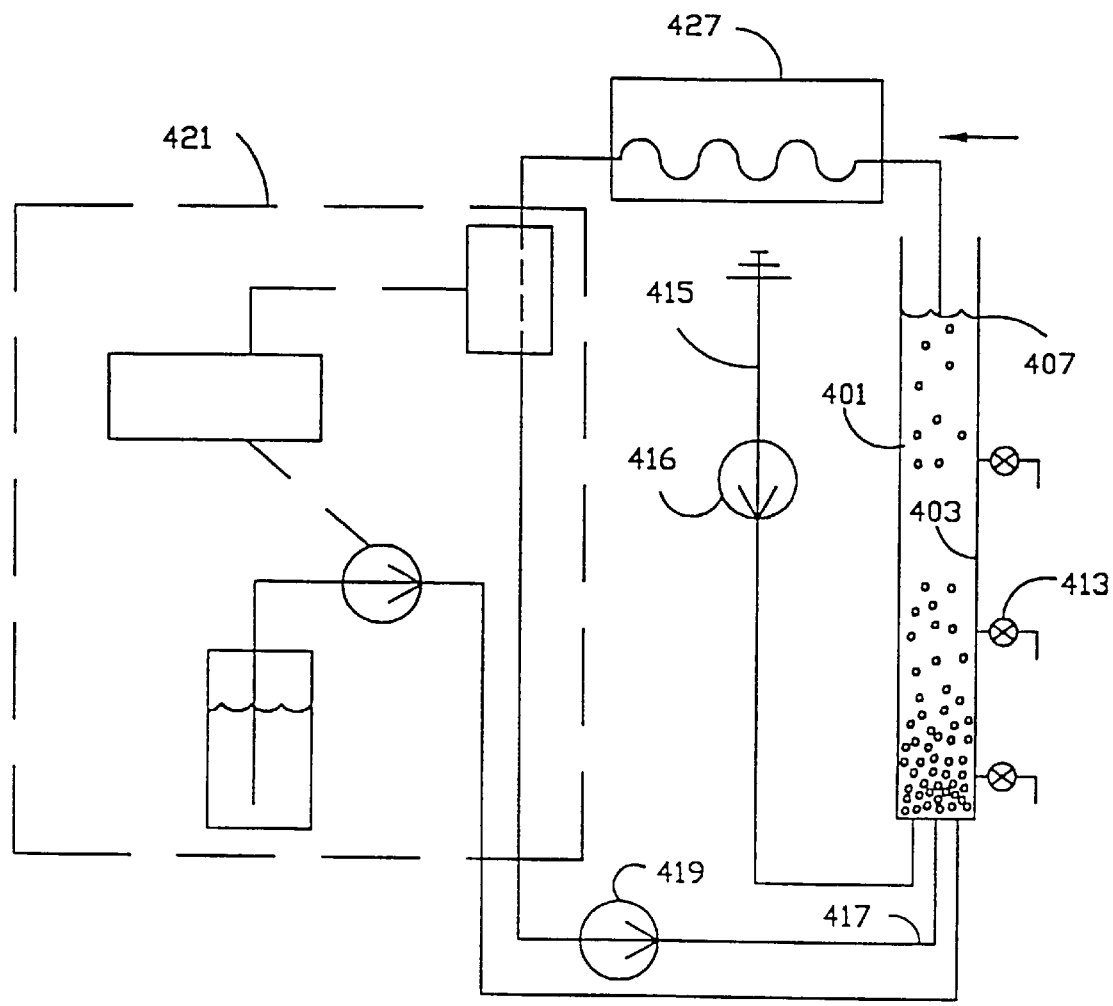
FIG. 5 and FIG. 7 present a comparison of an example of the present invention to an example of the background art.

Referring to FIG. 5, a comparison of a working example of the present invention to example of the prior art is presented. The proposed bioprocess is tested in a controlled experiment. In a series of "control" runs, a sample of pyrite concentrate 401 containing occluded gold is directly oxidized under aerobic conditions in aerobic reactor 403. In a second series of "treatment" runs, a second sample of the same pyrite concentrate 401 is indirectly oxidized under anaerobic conditions in anaerobic reactor 405. The extent to which gold can be extracted from each oxidized sample into a cyanide solution is then measured. The pyrite concentrate will be provided by a large international gold producer. Thiobacillus ferrooxidans cultures are purchased from the American Type Culture Collection (ATCC) and acclimated to the concentrate.

Both aerobic and anaerobic oxidation runs are conducted in upflow reactors to minimize the influence of reactor design on the results. The reactors consist of a clear plastic (acrylic) tube or column 407 three feet long and four inches in inside diameter fitted on the bottom with a plastic expander section 409 and on the top with a plastic effluent collector section 411. The reactors are also fitted with sampling taps 413 along their lengths to allow samples of partially-oxidized concentrate to be taken during each run.

In the case of the aerobic reactor 403, air 415 (containing oxygen and carbon dioxide) is introduced into the bottom of the reactor by means of air pump 416 and exits from the top. Leaching solution 417 that has been supplemented with nutrients is recirculated upward through the column by means of a recirculation pump 419 at a rate sufficient to suspend and mix the concentrate particles. The pH of the solution is controlled with a pH controller 421. The temperature of the leaching solution 417 is maintained at a constant set temperature by means of constant-temperature water bath 427. A 75-cubic inch charge of pyrite concentrate that has been inoculated with aerobically-grown Thiobacillus ferrooxidans (not shown) is added to the reactor at the beginning of each run and removed at the end. Although a set of preliminary runs are used to establish optimum operating conditions (and acclimate the culture), initially the column is operated at a temperature of 35° C., a pH of 1.0–1.8 to prevent the formation of obstructive precipitates, such as jarosites, a pulp density of 25 percent, and a dissolved oxygen concentration of 4 mg/l and an oxidation time of 48–72 hours.

In the case of the anaerobic reactor, air is excluded from reactor 405. Leaching solution 417 that has been supplemented with nutrients is recirculated upward through reactor 405 by means of a recirculation pump 419 at a rate that does not mix the bed. The pH of the solution is controlled with pH controller 421. A 75-cubic inch charge of pyrite concentrate (not shown) that has been inoculated with aerobically-grown Thiobacillus ferrooxidans is added to the reactor at the beginning of each run and removed at the end. Ferrous iron in the column effluent is oxidized to ferric state in an aerated continuous stirred tank reactor (CSTR) or plug-flow reactor 423 fitted with a settling well 425 to partially clarify the solution located adjacent to the column. The temperature of the leach solution 417 is maintained at a constant set temperature by means of constant temperature water bath 427. Although the models described above and a set of preliminary runs are used to establish optimum operating conditions (and acclimate the culture), initially the column is operated at a temperature of 35° C., a pH of 1.0–1.8 to prevent the formation of obstructive precipitates, such as jarosites, a pulp density of 50 percent, and a zero dissolved oxygen concentration and an oxidation time of 48–72 hours.

At the beginning and end of each often runs conducted under aerobic conditions and ten runs conducted under anaerobic conditions, three representative portions of the pyrite sample are analyzed by an independent laboratory for a standard set of constituents that includes carbon, inorganic carbon, total organic carbon, sulfide, sulfate sulfur and elemental sulfur. The samples taken at the end of the runs are withdrawn from the top, middle and bottom of the bed of pyrite particles. Three samples collected at the end of three runs are leached in cyanide by an independent laboratory to determine extractable gold concentrations.

Figure 6:
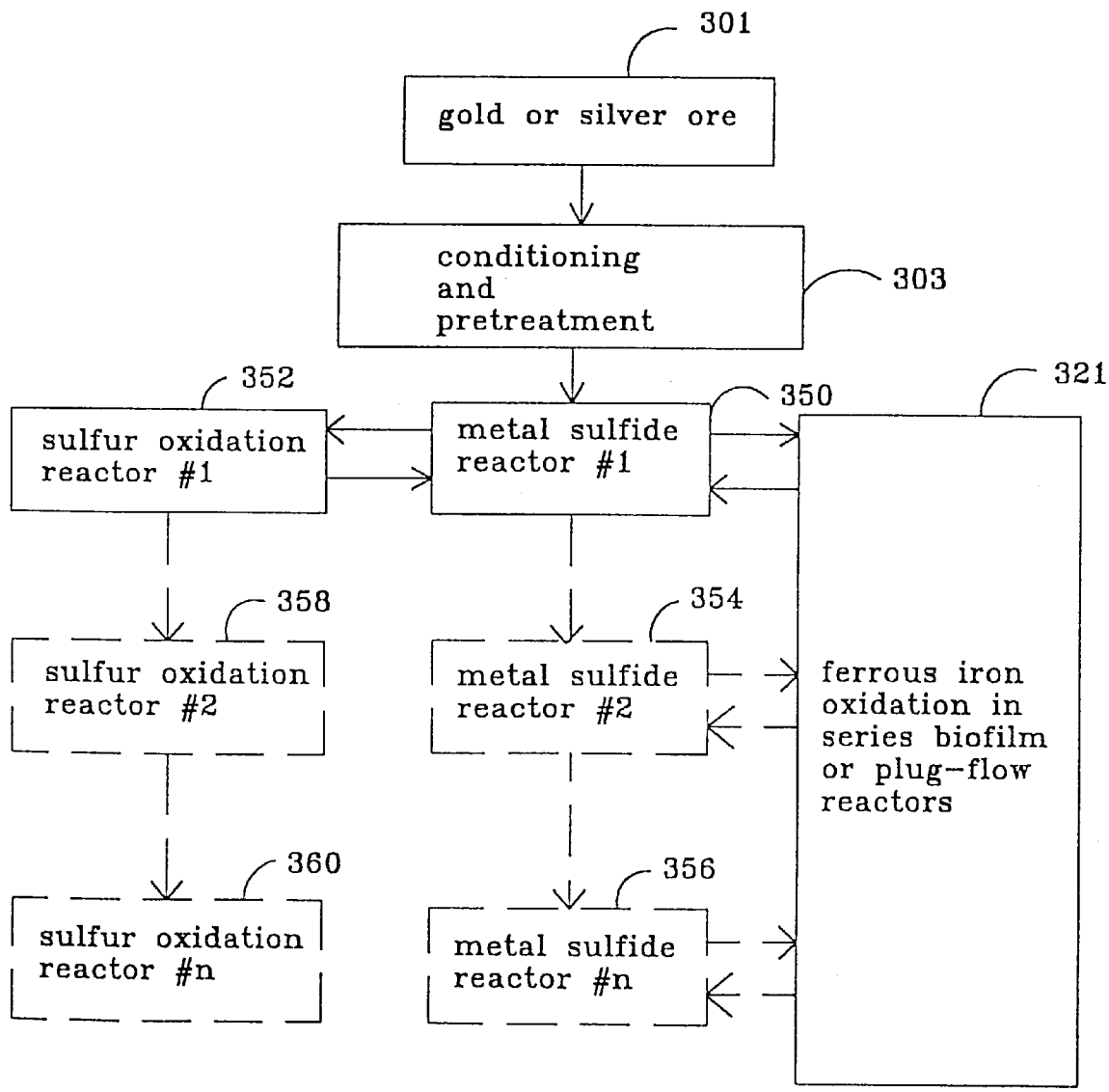
FIG. 6 is a highly schematic block diagram of an alternative configuration of the anaerobic oxidation reactor.
Figure 7:
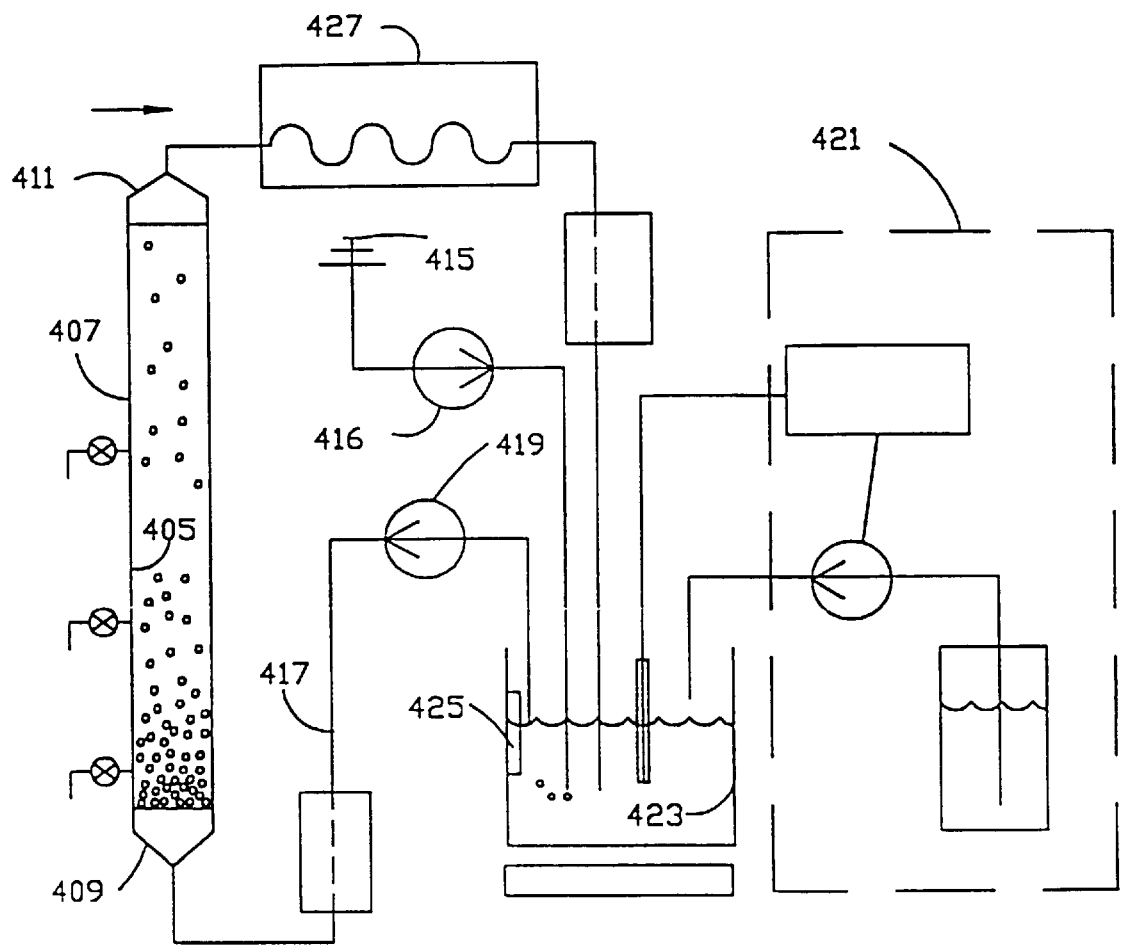

Referring to FIG. 6, an alternative embodiment of the anaerobic metal-sulfide oxidation reactor (reactor 101 in FIG. 3) is presented. The purpose of this alternative embodiment is to increase the efficiency of the anaerobic leaching step shown as Step 319 in FIG. 1. Referring again to FIG. 6, gold or silver ore 301 is conditioned and pretreated in Step 303 as described previously. For the proposed anaerobic process. The conditioned and pretreated ore is then introduced into first metal sulfide reactor 350 which is maintained at environmental conditions which are optimized for the oxidation of the particular metal sulfide ore undergoing treatment. Said optimized environmental conditions may include, but not be limited to, temperature, pH dissolved oxygen concentration, and nutrient additive concentrations. After a predetermined percentage of the metal sulfide ore has been oxidized in reactor 350, said ore is introduced to first sulfur oxidation reactor 352. Reactor 352 is maintained at environmental conditions which are optimized for the oxidation of elemental sulfur to sulfate. Said environmental conditions include the conditions described above. The transfer of ore between reactor 350 and reactor 352 may be either by batch transfer or continuous circulation transfer. Ferric iron ions required for the processes in reactor 350 and reactor 352 are supplied by Step 321 as described previously for the proposed anaerobic process. After the metal sulfide ore has been oxidized to a predetermined level in first reactor 350, said ore may optionally be introduced to second metal sulfide reactor 354. Reactor 354 is maintained at environmental conditions which are optimized for the oxidation of metal sulfide ores which have been partially oxidized previously in reactor 350. After treatment in reactor 354, the partially oxidized ore may optionally be introduced to one or more additional reactors 356 for more complete oxidation of the metal sulfide ore. Ferric iron ions are supplied to reactor 354 and reactors 356 as required from Step 321. After sulfur oxidation has been performed to a predetermined level in reactor 352, the ore may optionally be introduced to second sulfur oxidation reactor 358 and additional sulfur oxidation reactors 360. Reactor 358 and reactors 360 are maintained at environmental conditions which are optimized for the oxidation of elemental sulfur which has been partially oxidized in preceding reactors.

WORKING EXAMPLE NO. 2

A plant is provided to process (oxidize) 2,000 tons per day of ore containing 50 percent pyrite ($FeS_2$). The sulfur (sulfide) removal target is 75 percent. During conditioning, the crushed ore is converted into a slurry containing 50 percent solids that has a pH of 1.5. The slurry is introduced to the first of four anaerobic upflow reactors that are operated in series, each reactor having a detention time in a reaction zone of 8 hours. A regenerated liquid containing 2 g/l of dissolved ferric sulfate is introduced to each reactor and recirculated through each reactor. The ratio of the liquid recirculating rate to the liquid introduction rate is 10 to 1.

Spent solution is removed from the reactors at the same rate regenerated solution is added to them so that the solids concentration of the slurry remains approximately constant (±10 percent of its original value). The spent solution containing dissolved ferrous iron is introduced to a aerobic biofilm reactor filled with a packing having a surface area to volume ratio of 25 square meters/cubic meter. The liquid is recirculated through the biofilm reactor at a rate 10 times the rate spent solution is added to it. Air is blown upward through the reactor.

In the aerobic reactor, essentially all (greater than 90 percent) of the ferrous iron is converted to ferric iron by mesophilic iron-oxidizing bacteria growing on the surfaces of the packing in the reactor. The regenerated solution is then recirculated through the anaerobic metal-sulfide oxidation reactor.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What is claimed is:

1. A method for liberating gold from a metal sulfide ore or concentrate comprising the steps of:
   generating a ferric iron solution by exposing an iron-oxidizing bacterium to a ferrous iron solution in a first reactor under aerobic conditions,
   exposing a metal sulfide ore or concentrate containing gold to said ferric iron solution and a sulfur-oxidizing bacterium under anaerobic or anoxic conditions that essentially exclude dissolved molecular oxygen in a second reactor and that result in oxidation of said metal sulfide and in oxidation of elemental sulfur produced by oxidation of said metal sulfide,
   thereby liberating said gold from said metal sulfide ore or concentrate.

2. The process of claim 1 further comprising the steps of:
   producing excess heat in said first and second reactors,
   removing at least 90 percent of the excess heat produced in said first and second reactors from said first solution, and adding carbon dioxide to one or more of the reactors selected from the group consisting of:
   said first reactor, and
   said second reactor.

3. The method of claim 1 wherein said iron-oxidizing bacterium and said sulfur-oxidizing bacterium is at least one bacterium selected from the group consisting of:
   *Thiobacillus ferrooxidans,* and
   Sulfolobus sp.

4. The method of claim 1 wherein said ore or concentrate is crushed or ground and wetted to make a slurry, and wherein said first reactor is operated under a condition selected from the group consisting of:
   a mesophilic condition, and
   a thermophilic condition.

5. The method of claim 1 wherein said second reactor comprises one or more configurations selected from the group consisting of:
   a plug-flow reactor,
   a packed-bed reactors
   a counter-current, upflow, expanded-bed reactor,
   a continuously stirred tank reactor,
   an ore dump,
   a heap, and
   a vat.

6. An apparatus for liberating gold from a metal sulfide ore or concentrate comprising the steps of:
   means for generating a ferric iron solution by exposing an iron-oxidizing bacterium to a ferrous iron solution in a first reactor under aerobic conditions,
   means for exposing a metal sulfide ore or concentrate containing gold to said ferric iron solution and a sulfur-oxidizing bacterium under anaerobic or anoxic conditions that essentially exclude dissolved molecular oxygen in a second reactor and that result in oxidation of said metal sulfide and in oxidation of elemental sulfur produced by oxidation of said metal sulfide,
   thereby liberating said gold from said metal sulfide ore or concentrate.

7. The apparatus of claim 6 further comprising:
   means for removing excess heat from said first solution.

8. The apparatus of claim 6 wherein said second reactor comprises one or more configurations selected from the group consisting of:
   a plug-flow reactor,
   a counter-current, upflow, expanded-bed reactor,
   a continuously stirred tank reactor,
   an ore dump,
   a heap, and
   a vat.

9. The apparatus of claim 6 wherein said means for separating is selected from the group consisting of:
   means for thickening a slurry that comprises said ore or concentrate and said second solution, and
   a settling zone that is part of an upflow, expanded-bed reactor.

* * * * *